US006799236B1

(12) United States Patent
Dice et al.

(10) Patent No.: US 6,799,236 B1
(45) Date of Patent: Sep. 28, 2004

(54) METHODS AND APPARATUS FOR EXECUTING CODE WHILE AVOIDING INTERFERENCE

(75) Inventors: David Dice, Foxborough, MA (US); Alexander T. Garthwaite, Beverly, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 485 days.

(21) Appl. No.: 10/044,214

(22) Filed: Nov. 20, 2001

(51) Int. Cl.[7] ............................................. G06F 12/14
(52) U.S. Cl. ...................... 710/200; 710/263; 710/266; 710/48; 710/269
(58) Field of Search ............................... 710/263, 266, 710/48, 260, 200, 269; 718/102, 100, 107, 108; 714/23; 712/203, 244, 245

(56) References Cited

U.S. PATENT DOCUMENTS

| | | | |
|---|---|---|---|
| 3,984,820 A | * 10/1976 | Stanley et al. | 710/265 |
| 4,908,750 A | 3/1990 | Jablow | |
| 5,438,677 A | * 8/1995 | Adams et al. | 710/263 |
| RE36,462 E | 12/1999 | Chang et al. | |
| 6,467,007 B1 | * 10/2002 | Armstrong et al. | 710/260 |
| 6,697,834 B1 | * 2/2004 | Dice | 718/102 |

OTHER PUBLICATIONS

"Support for software interrupts in log-based rollback recovery" by Slye, J.H. and Elnozahy, E.N. (abstract only).*
"Computer-based multimedia system on computer organization and design" by Barua, S. (abstract only).*
Bershad, Brian et al. "Fast Mutual Exclusion for Uniprocessors", ACM SIGPLAN Notices: vol. 27, Issue 9 (Sep. 1992).

* cited by examiner

*Primary Examiner*—Gopal C. Ray
(74) *Attorney, Agent, or Firm*—Barry W. Chapin, Esq.; Chapin & Huang, LLC

(57) ABSTRACT

Mechanisms and techniques operate in a computerized device to execute critical code without interference from interruptions. Critical code is registered for invocation of a critical execution manager in the event of an interruption to the critical code. The critical code is then executed until an interruption to the critical code occurs. After handling the interruption, a critical execution manager is invoked and the critical execution manager detects if an interference signal indicates a reset value. If the interference signal indicates the reset value, the critical execution manager performs a reset operation on the critical code to reset a current state of the critical code to allow execution of the critical code while avoiding interference from handling the interruption and returns to execution of the critical code using the current state of the critical code.

24 Claims, 6 Drawing Sheets

METHODS AND APPARATUS FOR EXECUTING CODE WHILE AVOIDING INTERFERENCE

FIELD OF THE INVENTION

The present invention generally relates to systems for executing or otherwise performing code on one or more processors within a computerized device, and more particularly, to systems and techniques for atomically executing critical code without interference from interruptions or from other processors.

BACKGROUND OF THE INVENTION

Conventional computer systems and computerized devices include one or more central processing units (CPUs) or processors that can operate to execute or otherwise perform software programs that are encoded as a series of logic instructions within a memory system accessible to the processor(s). Such computer systems also typically include an operating system program encoded within the memory system. The operating system operates as a control program that controls or governs when the processor is able to execute other programs such as user processes. Multitasking operating systems allow a single processor within a conventional computer system to execute multiple processes or threads in a back-to-back or time-sliced manner such that each process is able to move forward and make progress in its execution by utilizing a portion of processor cycles for execution. The terms process and thread will be used throughout this description interchangeably to denote a related set of logic instructions that a processor can perform (e.g., execute, interpret, run, etc.).

Some conventional computer systems include multiple processors that can operate under control of a multiprocessing operating system. Such a multiprocessing operating system controls the execution of multiple processes across the range of available processors in the computerized device. As an example of a multiprocessing computer system in operation, an operating system may begin to execute a user process on a first processor for a period of time until an interrupt of some sort occurs to that user process. Perhaps the interrupt is caused when the processor executes an instruction in the user process that requires access to data stored within a disk drive coupled to the computer system. As a result of such an input/output (I/O) request, the operating system suspends execution of the user process on the first processor while other software (e.g., an I/O process) and/or circuitry within the computer system handles any required processing associated with the I/O interrupt. When the operating system later detects that handling of the interrupt is complete and the requested data is now available for the user process, the operating system then reschedules execution of the user process on the same processor, or possibly on a second or other processor since the first processor may have already been rescheduled and may be currently executing another process. In this manner, multi-processing operating system can "migrate" execution of processes from one processor to another to achieve greater overall processing throughput.

Certain software programs that execute as processes in conventional computer systems sometimes include a requirement that portions of code within the process be executed in an "atomic" or undisturbed manner. These portions of code in a process or program are often referred to as "critical code" or "critical sections". Generally, critical code is a series of one or more logic instructions associated with a process, such as microcode, machine language instructions, or even high-level language instructions, which a processor in the computer system must execute from start to finish without any interference. Typical sources of interference are interruptions and actions performed by other processes such as remote actions. Interference is generally defined as an external modification or change made (i.e., by code other than the critical code or the process containing the critical code) to data, memory contents, register contents, flags, or other information that is related to (e.g., referenced by) the critical code.

There are a number of reasons why a process may contain a series of instructions (i.e., critical code) that must be executed atomically (i.e., without interference). As an example, some conventional computer systems include memory systems that operate as shared memory. Shared memory may be, for example, main memory that allows two or more software processes to access the same set of memory locations during their execution. Processes can use shared memory for such functions as interprocess communication, process synchronization and for other reasons. When a process contains a series of instructions that operate on shared memory locations, it is often preferable that those instructions be executed atomically as critical code in order to ensure that the content of the shared memory is accurately maintained. If an operating system interrupts a sequence of critical code instructions that access the shared memory before the critical code sequence completes full execution (i.e., before the sequence completes execution from start to end), the state or contents of the shared memory might be unreliable upon return to execution of the critical code at the point of interruption since other processes or code that may have executed during the interruption may have caused interference to the shared memory. This is one example of interference caused by an interruption.

Software and computer system developers have created a number of conventional techniques to allow a sequence of critical code instructions in a process to execute in an atomic manner to ensure that interference caused by interruptions is avoided. One such conventional technique is an atomic instruction used within software code called a "compare and swap" (CAS) instruction. Generally, a CAS instruction provides a technique for depositing a value into a memory location while guaranteeing that processing leading up to the CAS instruction is not interrupted.

In operation, prior to execution of the CAS instruction, a processor executes a load instruction to fetch a value from a known memory location M. This memory location M is typically the target memory location to which data must be written to in an atomic manner (i.e., without interference). Then, a processor executes one or more critical code instructions in the code to perform any required critical code processing. Finally, the processor executes the CAS instruction typically as the last instruction at the end of the critical section of code. The CAS instruction receives a set of parameters including an old value, a new value, and an address of the memory location M. The CAS instruction obtains ownership of the shared memory or cache at the location M specified by the address parameter and then obtains the value of data stored at this location. The CAS instruction then compares the value obtained from location M with the old value parameter provided to the CAS instruction. If the old value (i.e., the parameter) equals the value obtained from the location of the address M (i.e., the value placed there are the beginning of the critical code section), then the CAS instruction can assume that no interference has taken place to this memory location and the CAS instruction proceeds to store the new value at that location M. The CAS instruction also returns the new value as output. In the alternative, if the old value parameter does not equal the value that the CAS instructions retrieves from the location of the address M, then the CAS instruction can infer that some processing has disturbed or caused interference to the original value at memory location M. In such cases, the CAS instruction does not write to memory, but does return the value fetched from location M. Upon such an indication, the processor can re-execute the critical code by jumping to the start of the critical code (i.e., by jumping back to the initial store instruction) in another attempt to execute the critical code form start to end without interference.

A typical conventional process uses the CAS instruction at the end of critical code to form a loop that continually attempts to successfully execute the critical code ending with the CAS instruction each time this instruction fails. In this manner, a process operating the CAS instruction will not continue execution beyond the critical code section until the CAS instruction is able to be successfully completed one time, thus guaranteeing that all of the critical code has been completely performed and the new value is placed into the memory location specified by the address parameter without interference from any interruptions that may have occurred during execution of all critical code preceding the CAS instruction (beginning with the original or old value being loaded from the memory location that the CAS instruction eventually checks).

An example of the CAS instruction is shown in the following code segment:

RETRY:
        LD M→TMP;
        TMP+1→TMP2; (interruption causing interference might occur here)
        CAS M,TMP,TMP2;
        IF TMP!=TMP2 GOTO RETRY;

As shown in the example above, a processor executes the LD instruction to load the contents of memory location M into the TMP variable. Next, a sequence of one or more instructions are executed to manipulate data. In this example the variable TMP2 is set to the value of TMP+1. During this processing, an interruption causing interference might occur causing a change to the memory location M. After processing all instructions that require atomic execution has been completed, the CAS instruction stores the contents of TMP2 into memory location M if and only if TMP and M are the same. After the CAS instruction, a test is done to check to determine if TMP and TMP2 are the same. If they are, the CAS instruction executed successfully and atomically. If not, then this processing repeats until the CAS instruction is successfully completed. The CAS instruction might fail, for instance, if another processor operates a process which accesses data at the memory location M thus causing interference, or if an interrupt occurred between the LD and the CAS, and another thread executed on the processor in the interim, that thread may have modified location M, rendering the values in TMP and TMP2 registers "stale" (i.e., out of date with respect to memory).

Another conventional technique that provides for atomic execution of critical code sections is called a "load linked store conditional" or LL/SC technique. Generally, the load linked store conditional technique involves the use of two processor instructions: a load linked (LL) instruction followed by a store conditional (SC) instruction. The two instructions operate much like conventional load and store instructions except that the LL instruction, in addition to doing a simple load, has a side effect of setting a user transparent bit called a load link bit. The load link bit forms a "breakable link" between the LL instruction and a subsequently executed SC instruction. The SC instruction performs a simple store to memory if and only if the load link bit is set when the SC instruction is executed. If the load link bit is not set, then the store will fail to execute. The success or failure of the SC instruction is indicated in a register after the execution of the SC instruction. For example, the processor may load such a register with a "1" in case of a successful store or may load the register with a "0" if the store was unsuccessful due to the load link bit being reset. The load link bit may be reset by hardware or software (i.e., changed from the state induced from the original LL instruction) upon occurrence of events that have the potential to modify the memory location from which the LL originally loaded data, and that occur during execution of the sequence of code between the LL instruction and the SC. In other words, a section of critical code that must be executed atomically can be inserted between the LL and SC instructions and the SC instruction will only store data to a specified memory location (i.e., the data being modified by the atomic code instructions) if the load link bit is not reset.

An example of where a link can be broken between an LL and SC instruction on a multiprocessor system is when an "invalidate" occurs to a cache line of shared memory which is the subject of the LL. In other words, the link might be broken between the LL and the SC instructions if the processor that executes the LL observes an external update to the cache line, or if an intervention of snoop operation invalidates the line associated with the bit. The link may also be broken by the completion of a return from an exception (i.e., interrupt). It may be the case, for example, that an interrupt to the critical code occurs after execution of the LL instruction but before the SC instruction. During the interrupt, some other processor may have successfully completed a store operation to that same shared data which causes the load link bit to be reset. To avoid interference, the software or hardware will explicitly break the link when returning from the operating system back into the interrupted critical code. This will result in the subsequent SC failing.

An example of pseudocode that illustrates the load linked store conditional technique is as follows (with the text in parenthesis indicating the nature of the processing performed):

RETRY:
        LL M→TMP; (load link bit set)
        TMP+1→TMP2; (interruption causing interference and resetting the load link bit might occur here)
        SC TMP2, M; (only store if load link bit still set)
        IF FAILED_BIT=1 GOTO RETRY;

As shown in the example above, the processor executes the LL instruction that operates to load the contents of memory location M into the TMP variable. The LL instruction further sets the load link bit. Next, a sequence of one or more instructions are executed to manipulate data. In this example the variable TMP2 is set to the value of TMP+1. During this processing, an interruption causing interference might occur causing the load link bit to be reset. After processing all instructions that require atomic execution is complete, the SC instruction stores the contents of TMP2 into memory location M if and only if load link bit set by the LL instruction is still set (i.e., is not reset). After the SC instruction, a test is done to check a failure bit (FAILED_BIT) in a processor status register associated with the processor executing this critical code to determine if the SC instruction executed successfully. If the FAILED_BIT equals 1, processing returns to the RETRY location in order to again attempt to execute this section of critical code. This processing repeats until the SC is successfully completed. The SC instruction might fail, for instance, if another processor operates a process which accesses data at the memory location M, thus causing the load link bit to be reset (i.e., thus causing interference).

Another conventional technique used to ensure atomic execution of critical code instructions is referred to as a lock/unlock technique. The lock/unlock technique can be used, for example, in situations where a portion of shared user level code must be executed atomically. When a user level process enters a section of shared critical code, the first instruction that is executed is a lock instruction which attempts to gain ownership of and set a flag indicating a user level process is in the process of executing this section of critical code. When the user level process succeeds in owning and setting this flag, the process can then execute the remainder of the critical code with or without interruption(s). When the process has completed execution of the critical code instructions, the final instruction the process executes to complete the critical code is an unlock instruction which clears the lock flag thus allowing another user level process to gain ownership of the lock flag and to execute this section of shared critical code. No process is allowed to execute this section of shared critical code until it owns the lock flag. If a user level process is interrupted during execution of a critical section of code, that user level process continues to "own" the lock on that section of code and other user level processes (as well as the interrupted process) are blocked from executing that section of code until the interrupt has been handled and processing returns to complete execution of the shared critical code by the user level process that owns the lock on the critical code. That process then completes execution of that section of critical code after the interrupt and performs the unlock instruction to free that critical section of code for ownership and execution by another user level process. Since no other processes could execute the critical code section during the interrupt, it is assumed that interference did not occur.

SUMMARY OF THE INVENTION

Conventional techniques for ensuring the correct atomic operation of critical code in a computer system without interference (due to interruptions, the action of other processors, or other causes) suffer from certain deficiencies. In particular, conventional critical section execution techniques such as compare and swap and load linked store conditional perform testing at the end of a section of critical code to determine if an interruption causing interference occurred sometime during execution of the critical code. If the critical code section contains many instructions (i.e., is lengthy), then an interruption or remote action that causes interference to the critical code near the start may not be detected until the end of the complete execution of the critical code section at which point the compare and swap or load linked store conditional are performed. In other words, such techniques may involve the processing of unnecessary critical code instructions prior to the detection of the interference and then subsequent re-execution of the critical code section from the beginning. Any critical code instructions which are executed after the occurrence of the interruption causing interference but prior to the operation of the compare and swap or load linked store conditional instruction are simply overhead instructions which consume valuable processing cycles.

In addition, techniques such as compare and swap and load linked store conditional cause re-execution of the critical code from a point that corresponds to the beginning of the critical code section. Accordingly, during execution of a critical code section containing numerous instructions, an interruption that causes interference that occurs towards the end of the execution of such instructions (i.e., thus many critical code instructions were executed prior to the interference from interruption) requires that all critical code instructions be re-executed again, even though some of such critical code instructions were properly executed the first time without interference.

Further still, conventional critical code execution techniques that guarantee atomic execution of the critical code provide no ability to detect interference immediately upon return from an interruption. Accordingly, the drawbacks mentioned above of unnecessarily executing critical code instructions prior to detecting interference cause unnecessary processor overhead.

The lock/unlock technique for ensuring atomic execution of critical code introduces another problem called the "convoy" problem. In the lock/unlock technique, once a first user process obtains ownership and sets the lock flag and begins execution of a critical code section, other user processes are unable to enter the critical code section and remain blocked until completion of the critical code section by the first user process. This can be problematic since the first user process might be interrupted for a prolonged period of time during execution of the critical code. Such an interrupt, whether or not causing interference, can impose a significant delay on the execution of the first user process as well as the other user processes that are blocked from entering the critical code section due to their inability to obtain ownership of the lock flag. In other words, the interruption delay imposed on the first user process is further imposed on other user processes that remain blocked while awaiting ownership of the critical code. Accordingly, those other user processes are "convoyed" until the first user process interruption is complete and the first user process completes execution of the critical code section and unlocks the lock flag.

In addition, lock/unlock techniques can also suffer from a problem known as the priority inversion effect. In such situations, a low priority process might obtain a lock on a portion of critical code. This low priority process might then be preempted by the operating system for a higher priority process. During execution, the higher priority process might require access to the critical code, but cannot do so due to the lock on this code still existing from the lower priority process. In such cases, the higher priority process is impeded by the lower priority process due to the lock.

These and other constraints of conventional techniques for atomically executing critical code sections can significantly increase the amount of processing time spent by a process in an attempt to fully execute a critical code section while avoiding the effects of interference caused by interruptions.

Embodiments of the invention provide the ability to execute critical code sections in an atomic manner without interference. Certain embodiments can significantly avoid certain drawbacks discussed above with respect to conventional techniques for atomically executing of critical code. One embodiment of the invention operates in a computerized device to register a critical code section (or a thread or process containing critical code) with an operating system for invocation of a critical execution manager in the event of an interruption to the critical code. The registration process can cause the operating system to store the address bounds of the critical code in a data structure for use by the critical execution manager upon returning from handling an interruption to execution of the critical code. Registration can also "register" the critical execution manager as code that is to be invoked upon returning from an interruption to the thread containing the critical code.

In one implementation, for registration to take place, a hook into the operating system can be exploited to indicate to the operating system that the critical execution manager is the code that is to be executed upon returning from all interruptions to the thread containing the critical code. Generally, the process containing the critical code informs the operating system of its intent to use the invention prior to entering critical code by registering a "call-back" address of code containing the critical execution manager with the kernel.

A processor then executes the thread and the thread may alternate between executing normal code and critical code. If an interrupt occurs during normal code execution, no special action is taken and the interrupt is handled normally. However, if the interrupt occurs while in the critical code, since registration is done just prior to entry into the critical code, upon completion of interrupt handling, processing returns to the call back address of the critical execution manager. In other words, once the operating system handles the interrupt, the operating system invokes execution of the critical execution manager configured according to embodiments of this invention. The critical execution manager is able to detect if the interrupt occurred in the critical code and can detect if an interference signal indicates a reset value. In other words, the critical execution manager is able to detect whether or not the interruption could potentially cause interference to critical code based upon a value of an interference signal. According to different embodiments of the invention, the interference signal can be set or can otherwise indicate the reset value in a number of ways. In a conservative implementation, the interference signal can be set during execution of the critical code to indicate that a reset operation is required on the critical code in the event of any interruption to the execution of the critical code, whether or not that interruption actually causes interference to information (e.g., processor or memory information) related to the critical code.

If, after returning from the interruption, the interference signal indicates a reset value, the critical execution manager performs a reset operation on the critical code to reset the current state of the critical code to avoid interference from handling the exception or interruption. The critical execution manager then returns processing to execution of the critical code using the current state of the critical code. Embodiments of the invention can determine if the interference signal indicates a reset value, for example, by detecting an interference signal set as a result of execution of the critical code, or by determining that a second thread was executed by a processor associated with the first thread (i.e., the thread containing the critical code) during handling of the interruption of the first thread, or by detecting that the thread containing the critical code has been migrated to a processor that is different that a processor upon which the thread was executing at a time of the interruption. Generally, the two preconditions that the critical execution manager can detect to indicate a reset value is present is that an interruption (i.e., preemption) or migration of a process occurred and that execution was taking place in the critical section at that time.

Once the critical execution manager determines that the interference signal indicates a reset value, the reset operation can be performed in a variety of ways according to different embodiments of the invention. Generally, the operation of performing the reset operation includes replacing current processor information (e.g., a current program counter) existing within the current state of the critical code with processor information obtained from the registered or saved state of the critical code (or of the registered thread) in order to allow the operation of returning to execution of the critical code to begin execution (e.g., restart) of the critical code without interference from handling the interruption. In this manner, the critical execution manager can use the registered state of the critical code saved prior to handling interruption to update the current state of the critical code that exists upon returning to the critical code after handling interruption.

According to embodiments of the invention, the state of critical code (i.e., the save state and/or a current state) can include information including processor information related to the critical code such as register values, flag settings or other processor specific information. The state of critical code can also include memory information that is related to the critical code such as addresses and/or values of memory locations referenced by instructions within the critical code.

In some embodiments of the invention, the operation of detecting if an interference signal indicates a reset value can include detecting that a thread containing the critical code has been migrated to a processor that is different than a processor upon which that thread was executing at the time of the interruption. In such a case, the reset operation can include receiving (e.g., as part of the interference signal) an identification of a processor upon which the critical code is scheduled to execute next and then adjusting memory references of offsets that are associated with the critical code for the processor upon which the critical code is scheduled to execute next in order to allow the critical code to properly reference processor specific data during operation of returning to execution of the critical code on the new processor. Accordingly, if after interruption the critical code is now migrated to another processor, the memory information associated with a new processor can be properly accessed by the critical code using the processor identification to computer address offsets into processor specific memory thus allowing the critical code to continue to operate properly.

Once embodiments detect that the interference signal indicates a reset value, embodiments of the invention can operate in a variety of unique ways to resume execution of the critical code. In particular, some embodiments of the invention are able to perform a "roll-back" or abort operation as part of the reset operation in order to restart the critical code from its beginning while in ensuring that the current state of the critical code is reset to a state that existed prior to occurrence of the interruption. This roll-back operation allows the operation of returning to execution of the critical code to begin execution of the critical code without interference from handling interruption. In particular, in the "roll-back" embodiments of the invention, the registered state of the critical code identifies the start of execution of the beginning of the critical code. Also in the roll-back embodiments, the reset operation (e.g., modifying current processor information existing within the current state of the critical code with registered thread information) includes resetting a program counter for the critical code to reference an instruction existing at the beginning of the critical code in response to the interruption. In doing so, upon returning to execution of the critical code, such execution begins at the start or beginning of the critical code and the current state of the code is exactly as it was upon initial entry into the critical code the first time it was executed.

Other embodiments of the invention can utilize a roll-forward operation to avoid interference caused by interruptions. In roll-forward embodiments of the invention, the operating system kernel inherently save a state of the critical code in response to the interruption to the execution of the critical code. Then, after handling the interruption and detecting that the interference signal indicates a reset value, the critical execution manager can restore, modify or reset a program counter for the critical code to reference an instruction that was interrupted in the critical code by referencing the kernel information indicating this state. This embodiment can also reload register information associated with the critical code from the registered state of the critical code. The register information can contain information related to the critical code at the time of the interruption. In a critical section of code, upon returning from an interruption, intermediate values in registers may be "stale." In one embodiment, the critical execution manager causes execution to resume at a special location that operates as a repair entry point that contains code to refresh the stale register values and then transfer control back an appropriate location in the critical code, which may be the interrupted location (roll-forward) or the beginning of the critical section (roll-back).

In the roll-forward embodiments, when returning to execution of the critical code after the interruption and after the reset operation, such execution begins at the instruction that was interrupted in the critical code as now referenced by the program counter for the critical code. In other words, this embodiment performs a roll-forward operation that causes the critical code to resume execution at the point of interruption instead of returning to the beginning of the critical code. This avoids having to re-execute critical code instructions that previously executed prior to the interruption that caused the interference.

Other embodiments of the invention are also able to perform the reset operation using one or more compensation transactions. Compensation transactions generally allow such embodiments to undo or reverse changes made to processor information such as register values related to the critical code that may have been modified by the interruption. Alternatively, compensation transactions can undo changes made to variables or registers by the critical code prior to the interruption point, but after commencing execution of the code. In other words, compensation transactions can either undo interference by compensating for such interference or in an alternative configuration, can undo operations performed by the prior execution of the critical code up to the point of interruption. As an example, if another processor accesses shared memory or registers referenced by the critical code during the interruption, the compensation transactions can detect this change and can reverse or undo this change in order to restore the processor or memory information to a state that existed prior to the interruption thus compensating for the interruption. This is useful in roll-forward embodiments to reestablish a register state as it existed at the beginning of the critical section so that when the program counter is set to reference the beginning of the critical code, the execution of the critical code can being having a complete state that is unmodified due to interference. In an alternative arrangement of the use of compensation transactions such as may be employed in roll-back embodiments, if some instructions in the critical code execute prior to an interruption to add ten to a variable, the compensation instructions might subtract ten from this variable value prior to returning to execution at the beginning of the critical code (in a roll-back embodiment) to thus re-establish the state of the critical code section as it appeared at its initial start. Conventional techniques for returning to execution of the critical code can fail in this regard as they simply return to execution of the start of the critical code but do nothing to prevent, reverse, undo or compensate for modification of register contents or other contents such as memory locations that may have occurred during interruption.

According to one embodiment of the invention, the techniques above apply to user level processes or threads that operate on processor specific data. In other words, the critical code is associated with a user thread that is executing on a specific processor within a multi-processing computerized device and further more, the critical code will be accessing data that is specifically and uniquely associated with the processor (e.g., processor specific data). In addition, the techniques of the invention do not require locking mechanisms (i.e., are lock-free or mutual exclusion free) and thus avoid issues such as the convoy problem associated with conventional techniques for executing critical code.

Embodiments of the invention can be implemented as methods in a process or as circuitry or hardware or as software or a combination of hardware and software within a computerized device or as software encoded within a computer readable medium. In particular, other embodiments of the invention include a computer system, such as a computerized device, workstation, handheld or laptop computer, or other device configured with software and/or circuitry to process all of the method operations disclosed herein as embodiments of the invention. In such embodiments, the computerized device is capable of executing critical code without interference and includes a processor and a memory encoded with an operating system, critical code, and a critical execution manager. An interconnection mechanism couples the processor and the memory and the processor executes critical code, the critical execution manager and the operating system causing the processor to perform the operations of embodiments of the invention as explained herein. In other words, a computerized device such as a computer that is programmed to operate as explained herein is considered an embodiment of the invention.

Other arrangements of embodiments of the invention that are disclosed herein include software programs to perform the method embodiment steps and operations summarized above and disclosed in detail below. As an example, an operating system configured with a critical execution manager that operates as explained herein is considered an embodiment of the invention. Alternatively, the critical execution manager may be implemented in a user process, or partly in an operating system and partly in one or more user space processes, or in any combination thereof. More particularly, a computer program product is disclosed which has a computer-readable medium including computer program logic encoded thereon that, when executed on at least one processor with a computing system or computerized device, causes the processor to perform the operations (e.g., the methods and steps) disclosed herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system to cause the computer system to perform the techniques explained herein as embodiments of the invention.

It is to be understood that the system of the invention can be embodied strictly as a software program, as software and hardware, or as hardware alone. Example embodiments of the invention may be implemented within computer systems, computer program products, operating systems and software applications manufactured by Sun Microsystems of Palo Alto, California, USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Figure 1:
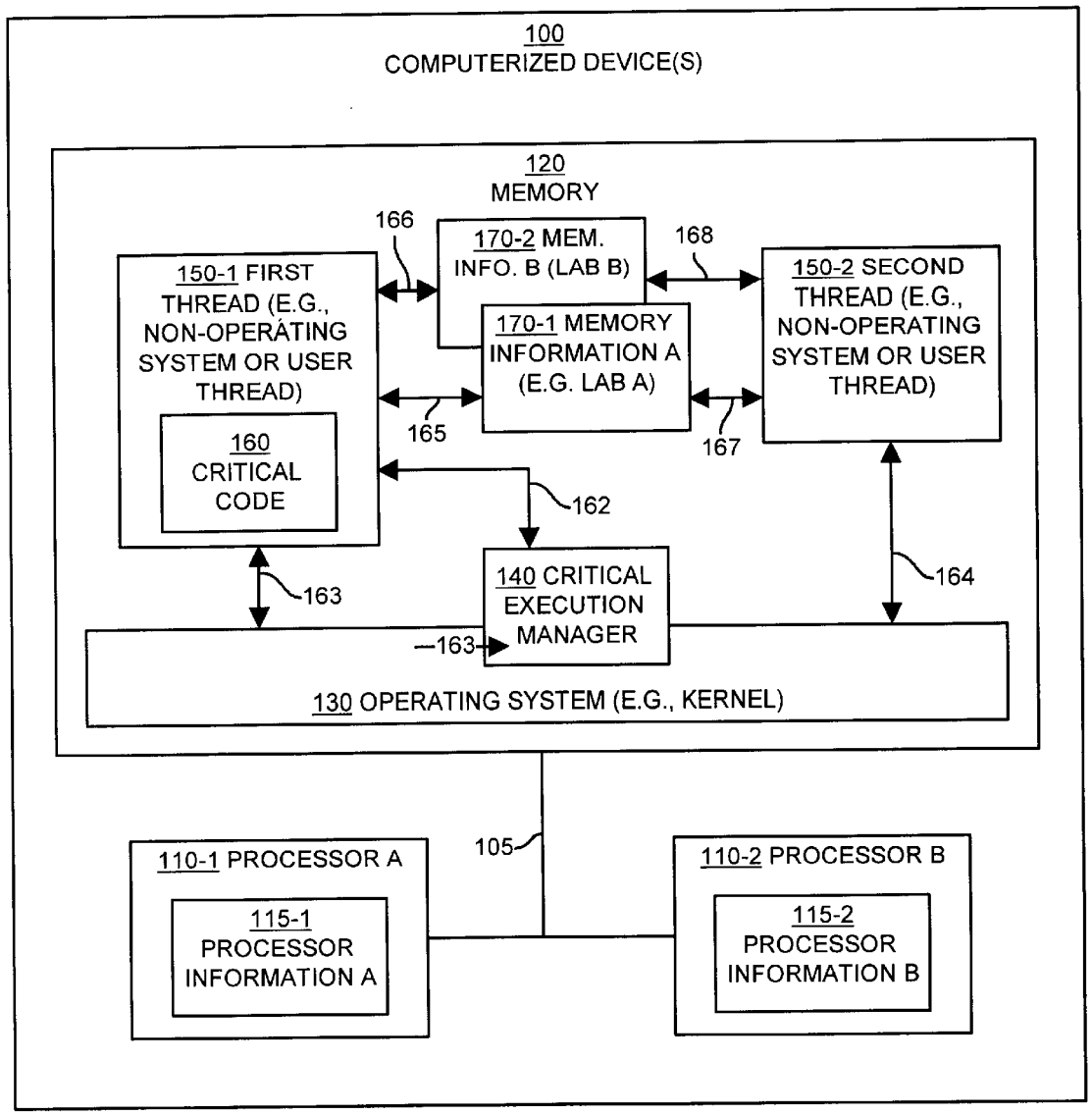
FIG. 1 illustrates an example of a computerized device that executes a thread containing critical code and that is equipped with a critical execution manager configured according to one embodiment of the invention.

Embodiments of the invention provide mechanisms and techniques to execute critical code in an atomic manner while avoiding interference caused by interruptions to execution of the critical code. In particular, embodiments of the invention allow processes such as user-level threads to execute sections of critical code without requiring synchronization techniques to be employed such as those commonly utilized in conventional systems to avoid interference for interruptions. Embodiments of the invention may be utilized by user level processes or threads that operate in a multi-processing environment which allows for migration of the user level processes or threads between processors in order to insure that those processes can atomically execute critical code without using synchronization techniques between other user processes. In addition, the multiprocessing environment may be one in which each processor in a computerized device has an associated segment or portion of processor specific data that the critical code references during execution. Such embodiments of the invention allow migration interruptions to the critical code while avoiding interference caused by differences in memory references within the critical code to the processor specific data depending upon which processor the critical code is migrated to during interruption.

In an example implementation, one embodiment of the invention registers a user level process or thread containing critical code with a device driver program called a critical execution manager that is integrated into an operating system in a computerized device. The critical execution manager may also reside (e.g., may execute) in whole or in part within user space or as a user program (i.e., may be split between the operating system and a user space critical execution manager program). The registration process provides the operating system and the critical execution manager with an indication of the starting point of the critical code within the code of the user process or thread. The registration procedure further instructs the operating system to invoke the critical execution manager upon returning from handling an interruption to the execution of the critical code.

A processor then begins execution of the user process containing the critical code until an interruption to the execution of the critical code occurs. At this point, the processor control passes to the kernel of the operating system that saves a state of the user process containing the critical code. As an example, a typical operating system saves register contents and program counter information indicating the location of the interrupt to the critical code in a kernel data structure within the operating system. Thereafter, the operating system handles the interruption. Handling the interruption may entail servicing an I/O request, rescheduling the user thread for future execution, migrating the user thread to another processor within a computerized device, or similar operations. After handling the interruption, processor control is passed to the critical execution manager that the operating system invokes due to the registration procedure, instead of returning to execution of the critical code that was originally interrupted. In other words, the registration procedure instructs the operating system to return control to the critical execution manager instead of the critical code itself upon return from handling interruption to the critical code.

At this point, the critical execution manager determines if critical code was interrupted and detects (i.e., determines) if an interference signal related to the critical code indicates the reset value. As an example, the critical execution manager can make a determination if the interruption occurred to the user process during execution of the critical code. As another example, the critical execution manager may determine that in interference signal indicates a reset value in the event that the user process is now scheduled to be executed on a processor is different than the processor upon which the critical code was executing at the time of interruption. If the interference signal indicates a reset value, the critical execution manager performs a reset operation on the critical code to reset the current state of the critical code to allow execution of the critical code while avoiding interference that may have been caused from handling the interruption.

Depending upon which embodiment of the invention is in use, the reset operation can perform either a roll-back operation which allows the critical code to be re-executed from the beginning, and thus resets the current state of the critical code to start or entry point to the critical code. In another embodiment of the invention, the critical execution manager can perform a roll-forward operation which allows the critical code to be re-executed from the point of interruption (as opposed to the beginning) and resets the current state of the critical code to a state existing at the time of the interruption. In an embodiment of the invention that provides for a roll-back operation, the critical execution manager can further utilize compensation transactions to undo, reverse or compensate for the effects of register or other interference caused by the interruption, thus allowing the critical code to be re-executed while avoiding interference from the interruption.

In either case, the critical execution manager is capable of allowing execution of the critical code while avoiding the effects of interference caused by the interruption. As an example, if the interruption results in a second process executing on the processor upon which the critical code was executing just prior to the interruption, the second process may corrupt information related to the critical code such as memory information or processor information (e.g., register contents). Accordingly, the reset operation performed by the critical execution manager is capable of reversing the effects of such interference in order to allow the critical code to resume execution but without requiring the critical code to use synchronization techniques such as those conventional techniques discussed above.

In situations where the user level process or thread operates in a multiprocessing environment, the interference signal that the operating system provides to the critical execution manager after handling the interruption can include an identification of the processor upon which the user process containing the critical code is scheduled to execute next. Accordingly, in one embodiment of the invention, the critical execution manager reset operation can further include adjusting an offset used to compute addressing information into processor specific memory for data referenced by the critical code based upon a processor identification received as part of the interference signal. In other words, if the critical code is migrated from one processor to another and each processor references processor specific memory that is not shared by other processors, the offset to critical code data in such processor specific memory for each different processor can be different. Accordingly, the critical execution manager can obtain the identification of the processor upon which the critical execution code is scheduled to execute next and can determine the appropriate offset to the data such that the critical code can be re-executed on the alternative processor using proper offsets thus avoiding interference from the migration.

FIG. 1 illustrates a computerized device 100 (of which there may be more than one) configured according to one example embodiment of the invention. The computerized device 100 may be any type of computerized device or system such as personal computer, workstation, portable computing device (e.g., laptop, palmtop or handheld computer), dedicated device, or the like. The example computerized device 100 includes an interconnection mechanism 105 (e.g., a data bus and/or circuitry) which couples a memory 120 (e.g., any computer readable medium such as random access memory (RAM) and/or read only memory (ROM), programmable memory, or even a disk or storage medium) and one or more central processing units referred to as processors 110 (two this example, processor A 110-1 and processor B 110-2).

The memory 120 is encoded with first and second non-operating system processes 150-1 and 150-2 that in this example are user threads or processes. The processes 150-1 and 150-2 can interact 163, 164 with the operating system 130 in order to be scheduled for execution upon one or both of the processors 110-1 and 110-2. The first non-operating system process 150-1 includes a section of critical code 160 that, for proper operation, requires atomic execution within the first non-operating system process 150-1. The memory is further encoded with an operating system 130 and a critical execution manager 140 configured according to one embodiment of the invention. The operating system 130 includes a kernel and the critical execution manager 140 includes portions that are integrated with the operating system 130 (e.g., integrated into the kernel, as will be explained). Other portions of the critical execution manager 140 execute within user process space.

Also illustrated within the memory 120 are two reserved areas called memory information A 170-1 and memory information B 170-2. Each of the memory information areas 170 is a memory buffer, cache, or local allocation buffer (LAB) associated with and reserved for processes that operate on one of the respective processors 110. In this example, memory information A 170-1 is an area of the memory 120 that is reserved for reference by processes or threads (e.g., 150-1 or 50-2) that execute upon or within processor A 110-1, whereas memory information B 170-2 is an area of the memory 120 that is reserved for access and use by processes or threads (e.g., 150-1 or 150-2) that execute upon or within processor B 110-2. The addresses or offsets of memory information A 170-1 and B 170-2 are different from one another. Since in this example the sets of memory information 170-1 and 170-2 are respectively reserved for use by processes executing on a respective processors 110-1 and 110-2, the memory accesses 165 through 168 represent access to these sets of memory information 150 during execution that process on one of those processors.

Each processor 110 includes a respective set of processor information 115. Processor information 115 on either processor A 110-1 or processor B 110-2 represents the contents of processor specific information related to a thread or process operating at that point in time upon that processor 110. In other words, processor information is the processor state (i.e., during execution) or saved processor state (during interrupt handling) related to a thread or process. As an example, if processor A 110-1 is executing critical code 160, then processor information A 115-1 includes the contents or values of a program counter for the critical code 160, as well as the set of values associated with any registers, flags, processor status words, or other information associated with the critical code 160. Likewise, processor information B 115-2 represents similar information for any code or any process executing at any point in time on processor B 110-2.

Quite often, a section of critical code can complete execution without interrupts. However, in cases where critical code execution is interrupted, according to the general operation of embodiments of the invention, a processor is able to execute the critical code 160 of the process 150-1 and after an interrupt to the execution of the critical code occurs and is handled by the operating system 130, the operating system 130 activates the critical execution manager 140 with an interference signal 163. Based on the interference signal 163, the critical execution manager can determine if execution was interrupted in the critical code 160 and can perform a reset operation 162 on the critical code 160 in order to allow execution of the critical code 160 to continue while avoiding interference from the interruption and without requiring synchronization procedures such as conventional load linked store conditional or compared and swap techniques. An interference signal represents a potential interference condition or risk or exposure to which a process may be subject. The interference signal itself may not imply that interference actually occurred, but indicates that interference may have occurred during an interruption or other interference to a process that was executing. Reference is now made to the flow chart of processing steps in FIG. 2 that illustrate an example operation of embodiments of the invention with respect to the example computerized device illustrated in FIG. 1.

Figure 2:
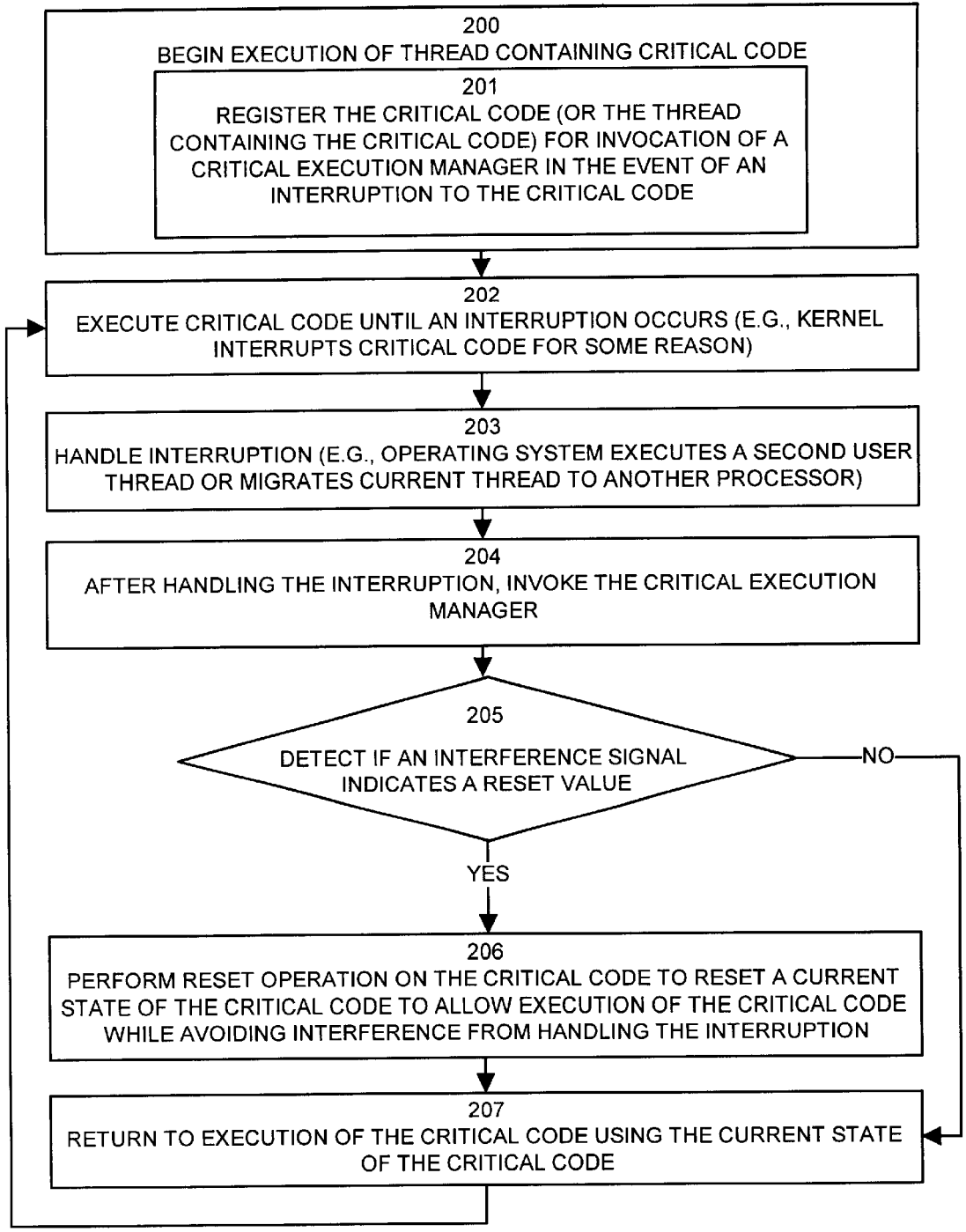
FIG. 2 is a flow chart of processing steps performed according to one embodiment of the invention to allow execution of critical code while avoiding interference from interruptions.

FIG. 2 is a flow chart of processing steps performed by a computerized device equipped with a critical execution manager configured according to one embodiment of the invention that allows execution of the critical code 160 while avoiding interference caused by interruption to the critical code 160. The description of the processing steps shown in FIG. 2 will be provided in conjunction with reference to an example operation of the invention as illustrated in FIG. 1.

In step 200, a processor 110-1 within the computerized device begins execution of a thread (e.g., first non-operating system process 150-1) containing critical code 160. At some point either before or during the execution of the thread 150-1, the computerized device 100 performs step 201 in which the processor A 110-1 performs logic instructions either within the critical code 160, within the program that provides the thread 150-1 (i.e., within a user process that at some point will access the critical code), within the operating system 130 or existing within some other process (e.g., a system registration service) which registers the critical code 160 (or registers the entire thread or process containing the critical code) with the operating system 130 for invocation of the critical execution manager 140 in the event of an interruption occurring to the critical code 160. Specific details of the registration process of the critical code 160 will be provided later.

For purposes of this example, registration generally causes the critical execution manager 140 to become aware of or have knowledge of the location such as a beginning address of the critical code 160 within the thread 150-1. In addition, registration activates a hook into the operating system 130 which indicates to the operating system 130 that if an interruption occurs during execution of the thread 151 (or to execution of just the critical code 160), then after handling the interruption and upon returning to execution of the critical code, the operating system 130 is to transfer execution to the critical execution manager 140. Stated differently, registration entails indicating, to the operating system 130, a beginning address or starting point for the critical code 160 as well as a pointer to code for the critical execution manager 140 which the operating system 130 will execute upon completion of handling an interruption to the thread 150-1 containing the critical code 160. Registration thus informs the operating system that the thread will be accessing critical sections of code and wishes to receive notification of potential interference. Thus a thread not accessing or using critical sections does not need to register and would not require use of the invention.

Next, in step 202, the computerized device 100, and specifically processor A 110-1 begins execution of the critical code 160 until an interruption to the execution of the critical code 160 occurs. During execution of the critical code 160, the critical code 160 executing within the first user thread 150-1 accesses 166 memory information A 170-1 which is, as explained above, is a local allocation buffer in the memory 120 reserved for use by processes that execute on processor A 110-1. At some point during the operation of step 202, the processor 110-1 interrupts the execution of the critical code 160. There may be various reasons why the operating system 130 interrupts execution of the critical code 160. As an example of such an interrupt, a multitasking time slice algorithm implemented within the operating system 130 may determine that a time slice allocated to the user thread 150-1 has expired and thus resources of the processor A 110-1 are now to be allocated to another process. It is to be understood that other types of interrupts can occur as well, such as page faults, I/O interrupts that activate a higher priority thread, and so forth. These are examples of preemption interrupts that lead to involuntary context switching. In other words, the processor is taken from the thread.

Next, in step 203, the operating system 130 handles the interruption. Continuing based on the example interruption suggested above, during handling of the interruption, the operating system 130 may execute a second non-operating system process 150-2 such as a second user thread 40 on the processor A 110-1. The operating system may also reschedule execution of the thread 150-1 on another processor, such as processor B 110-2.

In step 204, after handling the interruption (step 203) that occurred in step 202, the operating system 130 invokes execution of the critical execution manager 140 due to the registration of the first non-operating system process (i.e., user thread) 150-1 with the operating system 130 (that took place in step 201). According to one embodiment of the invention, the registration process that takes place in step 201 registers the code associated with the critical execution manager 140 as a device driver within the operating system 130 using a scheduler activation hook incorporated into the operating system 130. Such a scheduler activation hook causes the operating system 130 to transition from kernel mode back into user mode by transferring processor control to the critical execution manager code 140 instead of returning to the original process which was interrupted, which in this case is the thread 150-1 containing the critical code 160. Accordingly, by registering the critical execution manager 140 as a device driver to be activated by the scheduler activation hook into the operating system 130, when the critical code 160 is interrupted in step 203, the operating system transfers processing control to the critical execution manager 140 in step 204 instead of returning processing control back to the processing thread 150 which was originally interrupted (i.e., the code 160).

In step 205, the computerized device 100 executes code within the critical execution manager 140 to detect if an interference signal 163 indicates a reset value. The critical execution manager 140 receives the interference signal 163 as part of a callback from the operating system 130 upon completion of handling interrupt. Generally, a callback is a redirection or diversion mechanism that the operating system uses in this invention when returning from kernel-space to user-space. Instead of resuming executing at the next user instruction in the interrupted process (e.g., in the critical code) as would normally be the case, due to the registration process, the callback causes execution to resume execution at the registered user space address of the critical execution manager. Typically, the operating system passes a program counter or instruction pointer (i.e., an address) of an instruction in the critical execution manager to execute next (as specified during registration).

In one embodiment of the invention, the interference signal 163 also causes the critical execution manager 163 to receive a processor identification indicating an identity of the processor 110-1 or 110-2 upon which the thread 150-1 containing the critical code 160 is scheduled to execute next. In other words, interference signal 163 can identify the processor upon which the operating system 130 is scheduled to again begin execution of the critical code 160. In addition, the interference signal 163 can contain processor information A 115-1 that identifies or contains information related to the state of the critical code 160 as it existed at the time of the interruption. As an example, this information can include register values and a program counter or instruction pointer identifying the instruction within the critical code 160 that was interrupted.

As will be explained in more detail shortly, the interference signal 163 can indicate a reset value under a variety of circumstances and the reset value operates as a trigger condition to the critical execution manager 140 to perform a reset operation on the critical code in order to avoid any actual or possible interference which may have been caused by the interruption to execution of the critical code 160. Generally then, the purpose of the reset value is to flag or otherwise indicate such interference situations and to trigger the reset operation by the critical execution manager 140.

There are various ways for the critical execution manager 140 to be informed by the operating system that first, an interruption occurred in critical code, and second, for the critical execution manager to determine that the interruption either caused or is considered to have caused interference. As an example, in a conservative implementation of one embodiment of the invention, any interruption at all to the critical code 160 may prompt the operating system to provide an interference signal 163 that indicates a reset value. In other words, whether interference actually occurred or not, the existence of an interruption to critical code can be considered grounds to perform a reset operation. In another example, if the operating system migrates the interrupted thread to another processor, then the interference signal can contain a processor identity that is different that a formerly saved processor identity. In another example, if any user thread executed during the interrupt (but the processor identity might be still the same), then the operating system may provide an interference signal to the critical execution manager 140.

Once processor control is transferred to the critical execution manager 140, to determine if the interruption occurred during execution of critical code, in one configuration, the critical code 160 may contain a critical code flag instruction that is executed upon entry into the critical code 160 in order to set the interference signal to indicate a reset value. The critical execution manager 140 can detect the setting of this interference signal to infer interference occurred. In another configuration, the critical code 160 may contain an idiomatic instruction which when executed utilizes critical code registers reserved for such data or instructions. At least one of such critical code registers can contain a value at the time of interruption that indicates a reset value and which the critical execution manager 140 can detect. In still another implementation, the critical execution manager 140 can obtain access to the registration or other critical code or thread saved state data structure(s) (e.g., maintained in or by the kernel or saved as part of the registration procedure) to obtain the address bounds of the critical code 160. Using this information, the critical execution manager 140 can detect interruption of the critical code based on the value of the current program counter or instruction pointer, captured or saved by the kernel at the time of interruption that indicates or identifies whether of not that instruction is within the address bounds of the critical code 160 that was interrupted. In yet another configuration, the critical execution manager 140 can detect interruption of the critical code 160 if such an interruption occurred during execution of a blocking call instruction that sets a flag or other indicator, since such an instruction would only be used within the critical code 160.

It is to be understood that these are example techniques to determine if the interruption occurred during execution of critical code, and if so, if the interference signal 163 indicates a reset value. Other techniques can be used as well. It is also to be understood that a portion of the critical execution manager 140 can be built into or configured to operate as part of the operating system 130 and thus some or all of the aforementioned functionality need not be natively present in the operating system.

In step 205, if the critical execution manager 140 detects that the interference signal 163 indicates a reset value, processing proceeds to step 206.

In step 206, the critical execution manager 140 performs a reset operation on the critical code to reset the current state of the critical code to allow execution of the critical code while avoiding interference caused from handling the interruption. The interference, such as another process modifying memory or register information associated with the interrupted critical code 160, may or may not actually exist. In any event, if the interference signal indicates a reset value, the critical execution manager 140 performs a reset operation nonetheless.

As will be explained shortly, different types of reset operations are possible depending upon which embodiment of the invention is used. Generally, a roll-back reset operation is possible in which the critical execution manager 140 resets the current state of the critical code 160 in order to resume execution of the critical code 160 from its beginning or start point. In an alternative embodiment of the invention, the reset operation comprises a roll-forward technique in which processing can proceed from the point of interruption within the critical code 160. Each of these techniques will be explained in detail below.

After processing the reset operation in step 206, processing proceeds to step 207 at which point the computerized device 100 returns to execution of the critical code using the current state of the critical code.

Also as illustrated by the flow chart of processing steps shown in FIG. 2, in step 205, if the critical execution manager 140 determines that an interference signal 163 does not indicate a reset value, processing also proceeds to step 207 to return to execution of the critical code 160 without performing a reset operation.

Following the processing of step 207, processing proceeds back to step 202 to continue execution of the critical code either until the critical code 160 is complete or until another interruption occurs to the critical code at which point the processing explained above from step 203 through 207 is repeated.

According to the aforementioned processing techniques, embodiments of the invention allow critical code operating within a first process or thread such as a non-operating system user thread 150-1 to execute in the presence of interruptions which may cause interference to the critical code 160. Since the operating system 130 is configured to return processing control to the critical execution manager 140 instead of returning control to the critical code 160, the critical execution manager 140 can make a determination if a reset operation is required in order to avoid interference caused by the interruption. If the reset operation is required, the critical execution manager can perform either a roll-back or roll-forward reset operation and then can cause whichever processor 110-1 or 110-2 is scheduled to execute the critical code 160 next to begin execution of the critical code while avoiding any actual or possible interference from the interruption.

Figure 3:
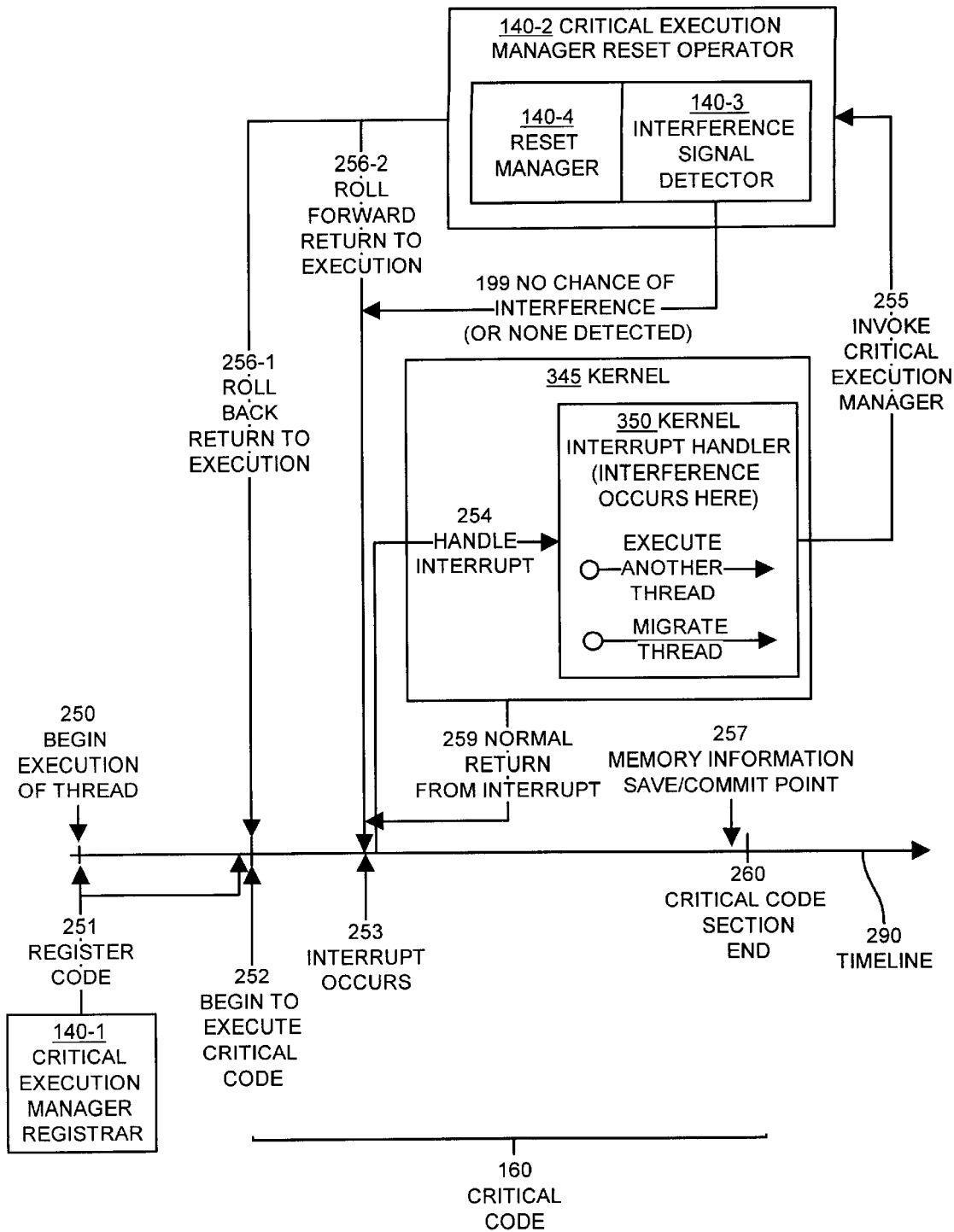
FIG. 3 illustrates a process control flow and timing diagram that shows operations of embodiments of the invention.

FIG. 3 illustrates an example of a timing and processing flow control diagram for operation of a processing thread 150 that contains critical code 160 which experiences an interruption within a computerized device configured according to example embodiments of the invention.

As illustrated in FIG. 3, a timeline 290 progresses from left to right in the figure. FIG. 3 also indicates, in parallel with the timeline 290, the beginning 252 and ending 260 of this example critical code 160.

Beginning on the left-hand side of the timeline 290 at location 250, a processor 110 within a computerized device begins execution of a thread 150-1 containing critical code 160. At location 251, either before, at the moment of, or during execution of the thread 150 (or upon entry into execution of the critical code), processing within the computerized device 100 registers the critical code 160 with a critical execution manager registrar 140-1. This registration processing in one embodiment of the invention identifies the address locations of the beginning of the critical code (i.e., location 252 in FIG. 3) to the operating system 130 and further operates the aforementioned scheduler activation technique in order to register the critical execution manager 140 as a device driver which should be operated upon returning from an interrupt to the critical code. Execution of the thread then continues to location 252 at which point the processor begins or enters execution of the critical code 160. Execution of the critical code continues until location 253 at which point an interrupt to execution of the critical code 160 occurs.

In response to the interrupt occurring at location 253, processing control is passed to the kernel 345 of the operating system in order to handle the interrupt at location 254. Within the operating system 130, the kernel interrupt handler 350 handles the interrupt. As illustrated in this example, the kernel 345 may at this point begin execution of another thread (e.g., 150-2 in FIG. 1) or process upon the processor 110-1 which was previously executing the critical code 160. This may cause interference to data or information related to the critical code 160. Alternatively, the kernel may decide during handling of the interrupt that the thread containing the critical code 160 is to be migrated to a different processor in a multiprocessing computerized device 100. This is another example of interference, since the state of the processor specific memory information 170-2 (FIG. 1) for processor B 110-2 will be different that the state of the processor specific memory information 170-1 which the critical code 160 was previously accessing prior to the interruption. As an example, the offsets to data in each of these sets of memory information 170-1 and 170-2 may be different.

In any event, after handling of the interrupt is complete, the kernel 345 invokes execution of the critical execution manager reset operator 140-2 at location 255. As noted above, this occurs due to the registration procedure previously performed at location 251 in which the operating system is instructed or otherwise informed that the critical execution manager reset operator 140-2 is a device driver that should be executed by the operating system 130 upon completion of an interruption to the registered thread 150-1 containing the critical code 160.

The critical execution manager reset operator 140-2 in this embodiment of the invention operates in user space and includes a reset manager 140-4 and an interference signal detector 140-3. Generally, the interference signal detector 140-3 can detect if the interruption occurred in critical code 160 (e.g., by using the registered address bounds of the critical code in comparison with kernel interrupt saved state information, such as a program counter address of the interrupted instruction or by other methods) to determine that critical code 160 was actually interrupted (as opposed to the interruption occurring elsewhere in the thread 150-1). Next, the interference signal detector 140-3 can determine if the interference signal (255 in FIG. 3 or 163 in FIG. 1) indicates a reset value in a variety of ways depending upon which embodiment of the invention is implemented.

In one embodiment of the invention, the interference signal detector 140-3 can detect that the interference signal indicates a reset value by examining the interference signal (e.g., the value of a flag or register) set as a result of the operation of execution of the critical code. According to another embodiment of the invention, the interference signal detector 140-4 can detect that the interference signal indicates a reset value by determining that a second thread or process (e.g., 150-2 in FIG. 1) was executed on a processor (e.g., 110-1) associated with the first thread containing the critical code 160 during handling of the interruption (e.g., by conferring with the kernel in the operating system 130). In other words, if another thread (e.g., 150-2) executed on the same processor (e.g., 110-1) as the thread (150-1) that contains the critical code 160 (i.e., the thread that was interrupted), an interference signal 163 indicates a reset value and the interference signal detector 140-4 detects this condition. In still a further embodiment, the interference signal detector 140-4 can utilize a processor identification contained within the interference signal 163 to determine that the thread containing the critical code 160 has been migrated to a processor that is different than a processor upon which that thread was executing at the time of interruption. In still another configuration, the interference signal may indicate a reset value if another registered thread (i.e., another thread that has also registered itself as requiring use of the critical section in an atomic manner) has run on the processor during the interrupt time period. In such a case, if other unregistered thread ran, there may be no need to perform a reset operation as it may be assumed that such threads do not access critical code and thus interference could not occur.

In another embodiment of the invention, the portion of the critical execution manger 140 that is integrated into the operating system 130 may or may not be required to deliver an upcall containing the interference signal 163 from the kernel space to the criticial execution manager portion 140 that operates in user space if one of the aforementioned conditions are not met. In other words, the operating system can be configured with a portion of the critical execution manager 140 that makes a determination if a reset operation is required based one or more on the aforementioned conditions and indicates this in the interference signal 163. If no interference condition(s) exists, then a call from the operating system 130 to the user space portion of the critical execution manager 140 might be avoided altogether and processing can resume in the thread at the point of interruption. Thus, if there is no chance of interference or there is none detected, the thread can resume execution at the point of interruption, as shown in FIG. 3 by the processing path 199.

Once the interference signal detector 140-4 performs the processing of step 205 from FIG. 2 to determine that an interference signal indicates a reset value, the reset manager 140-3 performs the processing of step 206 as discussed above to perform the reset operation on the critical code.

According to one embodiment of the invention, the reset manager 140-3 can perform the reset operation using a roll-back operation as shown at location 256-1 in FIG. 3 in order to return execution to the beginning of the critical code at location 252. According to another embodiment of the invention, the reset manager 143 can perform a roll-forward operation as indicated at location 256-2 in FIG. 3 in order to return execution to the point at which the interrupt occurred in the critical code (i.e., location 253 in FIG. 3).

In this manner, the critical execution manager reset operator 140-2 can either roll-forward or roll-back the current state of the critical code 160 to either the beginning of the critical code or to the point in the critical code at which the interrupt occurred in order to avoid interference from the interruption. As will be explained in detail shortly, both the roll-forward and roll-back operations allow a general resetting of the state of the critical code 160 such that any modifications, for example, to processor registers, instruction pointers or shared memory locations which are modified or changed during interruption will have no effect on further execution of the critical code. This results in the critical code 160 being subsequently executed atomically no matter how many interrupts occur during execution of the critical code. In other words, the processing flow illustrated in FIG. 3 can repeat until the critical code is able to execute from the beginning at location 252 to the critical code section end at location 260.

In one embodiment of the invention, any instructions within the critical code 160 that cause memory information to be saved or committed such as writing the contents of registers out to the appropriate set of memory information 170-1 or 170-2 are performed towards the end 260 of the critical code 160. In this manner, the reset operation can be assured that the critical code has not made modifications or commitments to shared memory that might be accessible to other processes or threads in the event of interruption. It is noted that processing path 259 in FIG. 3 is shown for completeness and illustrates normal execution flow for an interrupt without the use of the invention.

Figure 4:
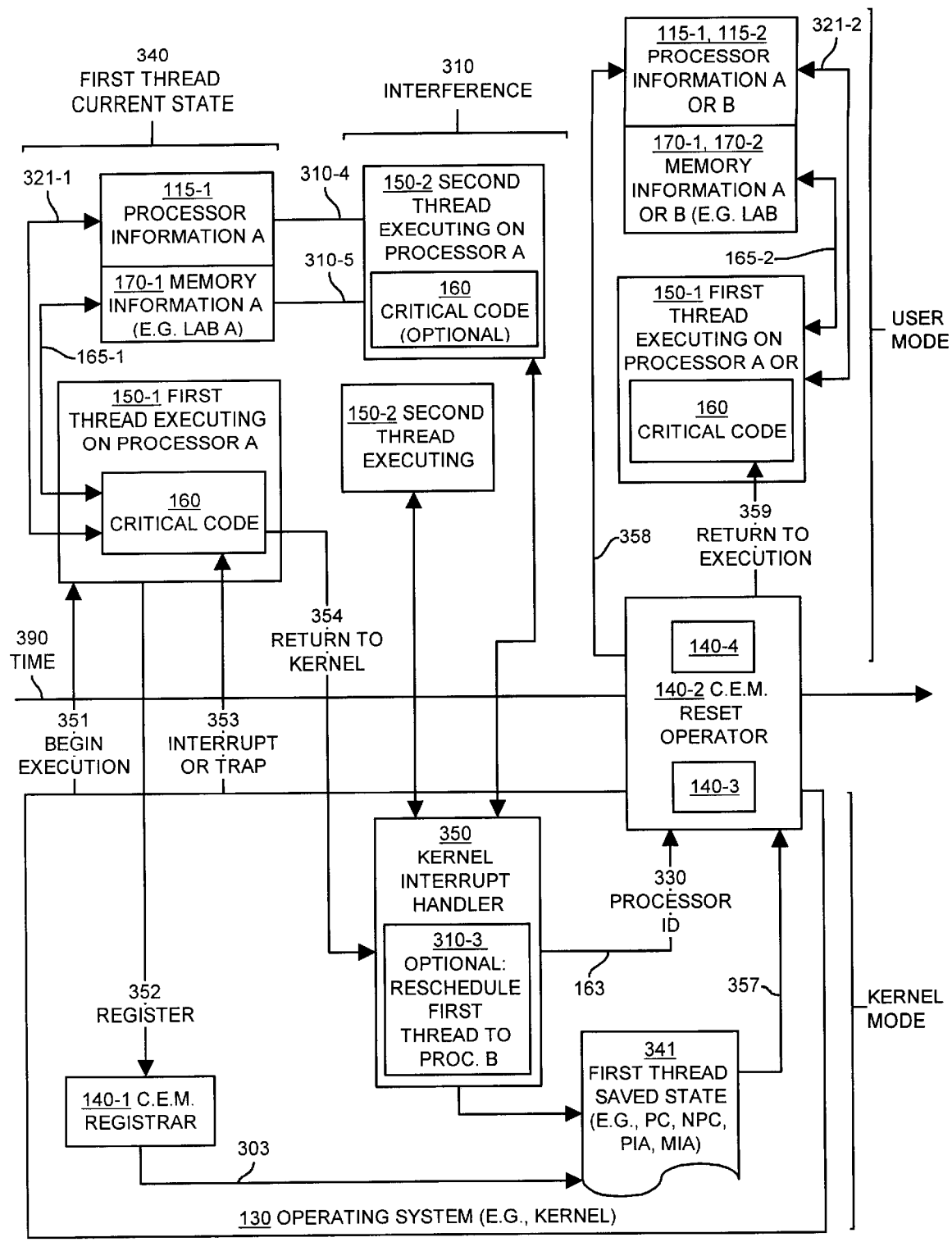
FIG. 4 is a more detailed example of an operation and processing flow diagram that shows execution of a thread containing critical code while avoiding interference caused by interruptions according to one embodiment of the invention.

FIG. 4 illustrates a more detailed architecture and processing flow diagram of a computerized device configured according to one embodiment of the invention that implements the aforementioned processing techniques. The processing flow illustrated in FIG. 4 is similar to that of FIG. 3 in that a timeline 390 progresses from left to right. The operation of the architecture and processing flow illustrated in FIG. 4 will be discussed in relation to the flow chart of processing steps shown in FIGS. 5 and 6 that show more detailed processing operations of one embodiment of the invention.

Figure 5:
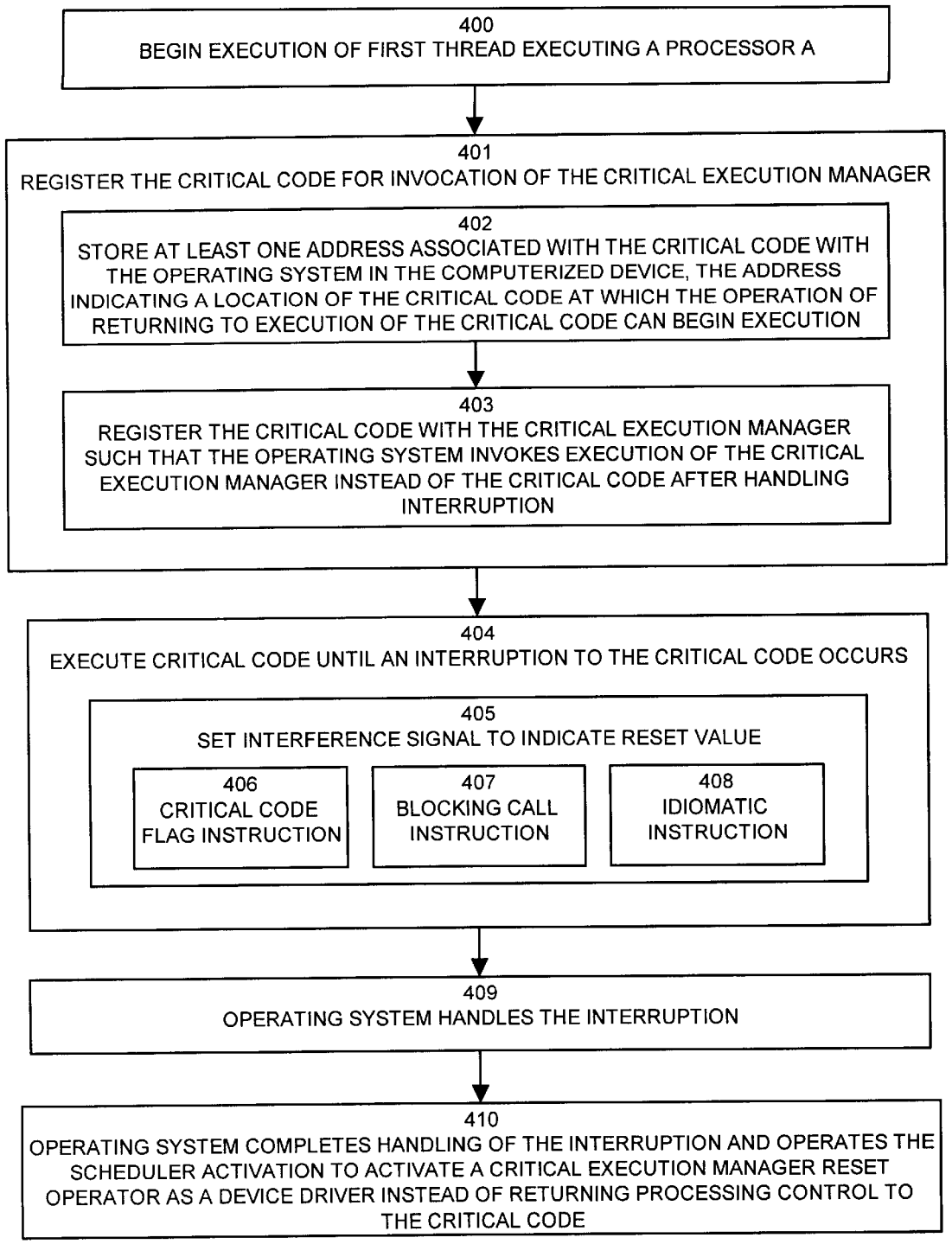
FIGS. 5 and 6 are a flow chart of processing steps that illustrate details of processing performed according to one embodiment of the invention to avoid interference caused by interruptions to the execution of critical code.

In step 400 in FIG. 5, the operating system 130 in FIG. 4 begins execution of a first thread on processor A 110-1 (FIG. 1) at location 351. During execution, the first thread 150-1 accesses 321-1 processor information A 115-1 associated with the processor A 110-1 and further accesses 165-1 memory information A 170-1 which is processor specific memory information reserved for use by processes executing on processor A 110-1.

In step 401, the critical code 160 is registered with the operating system 130 at location 352 in FIG. 4 using the critical execution manager registrar 141. The registration process within step 209 results of the creation 303 of the first thread saved state 341 within the operating system 130. In one embodiment, the first thread saved state may simply be the address of an instruction in the critical execution manager 140 to which processing is to be transferred upon return from an interrupt to the thread 150-1. Note that such a registration process can be done at any time prior to or during execution of the critical code 160.

Specifically according to this registration procedure, in step 402, the critical execution manager registrar 140-1 stores at least one address associated with the critical code 160 with the operating system 130 in a computerized device as the first thread saved state (associated with the first thread 150-1). The stored address indicates a location of the critical code in which the operation of returning to execution of the critical code can begin. In another embodiment of step 402, the entire address range of critical code instructions is stored.

Next, in step 403, the critical execution manager registrar 140-1 registers the critical code 160 such that the operating system 130 will invoke execution of the critical execution manager 140 (i.e., the critical execution manager interference signal detector 140-3) instead of the critical code 160 after handling an interruption. This registration process can be achieved in one embodiment of the invention using "ioctl" (i.e., input output control) calls to the scheduler activation hook within an operating system 130 in order to register the critical execution manager interference signal detector 140-3 as a device driver that is to be activated upon returning in the operating system from an interruption to the critical code 160.

After registration is complete, processing proceeds to step 404 at which point the processor executes normal thread code and the critical code 160 until an interruption or trap occurs to the critical code 160 as indicated at location 353 in FIG. 4. In certain embodiments of the invention, during execution of the critical code 160, the interference signal 163 may be set via setting a flag, register or other indicator to indicate a reset value and hence a reset operation may be required, as shown in step 405 in FIG. 5.

In one embodiment of the invention as shown in step 406, a critical code flag instruction may be executed to set the interference signal to indicate a reset value. The critical code flag instruction may be an instruction that sets a processor status word flag to indicate that execution has entered into an area of critical code and thus interference must be avoided in the event of any interruption. Upon exit of the critical code, such a flag can be cleared by a similar critical code flag instruction in order to indicate that execution is no longer proceeding within critical code 160.

In another embodiment of the invention as shown in step 407, the critical code executes a blocking call instruction which can produce a result that the critical execution manager reset operator 140-3 can interpret as a reset value for the interference signal 163.

In yet another embodiment of the invention, execution of the critical code can involve operation or execution of an idiomatic instruction that uses special registers reserved for critical code operations only. A value in one or more of such registers can be used as a trigger for the interference signal to indicate a reset value.

Once execution of the critical code is interrupted in step 404, processing proceeds to step 409 at which point the operating system handles the interruption as shown in FIG. 4 at location 354. In the embodiment illustrated in FIG. 4, a kernel interrupt handler 350 handles the interruption that may cause interference to processor information 115 or memory information 170 associated with the interrupted critical code 160. Upon returning to (e.g., entering or vectoring into) the kernel at location 354 in FIG. 4, in order to handle the interruption, the operating system kernel interrupt handler 350 stores the processor information A 115-1 as part of its standard kernel data structures for any process which is interrupted. This processing is shown at location numeral 354-1 in which the kernel interrupt handler 350 deposits this information into the first thread saved state 341. In other words, when the operating system 130 interrupts an executing process, the operating system 130 saves register information and program counter information identifying the interruption point within the code of the interrupted process.

As will be explained shortly, this information may be of used to the critical execution manager reset operator upon performing a roll-forward reset operation, as well as for determining (as explained above) that the interruption occurred within the critical code 160.

Different types of interference are illustrated in FIG. 4 at locations 310-1 through 310-3. In particular, the kernel interrupt handler 350 may schedule a second thread 150-2 to execute on processor A 110-1. This in and of itself may be considered interference for purposes of embodiments of this invention. Alternatively, interference may occur when the second thread 150-2 accesses 310-1 processor information A 115-1 or when the second thread 150-2 accesses memory information A 170-1 during its execution. Alternatively, the second thread may execute critical code 160 which is shared critical code thus disturbing the state of the shared data accessible to the critical code 160.

In any event, after the operating system handles interruption in step 409, processing proceeds to step 410.

In step 410, the operating system 130 completes handling of the interruption and operates the scheduler activation to activate the critical execution manager reset operator 140-3 as a device driver. Recall that the critical execution manager interference signal detector 140-3 was registered as a device driver to be executed upon returning from interruption to the first thread 150-1 (or upon interruption to the critical code 160). This is illustrated by the interference signal 163 in FIG. 4 entering in the operating system 130 into the critical execution manager (i.e., into the interference signal detector 140-3). The interference signal 163 passed from the kernel interrupt handler 350 to the critical execution manager interference signal detector 140-3 (i.e., to the registered instruction) allows the critical execution manager interference signal detector 140-3 to determine if a reset operation is required or not on the critical code 160.

Figure 6:
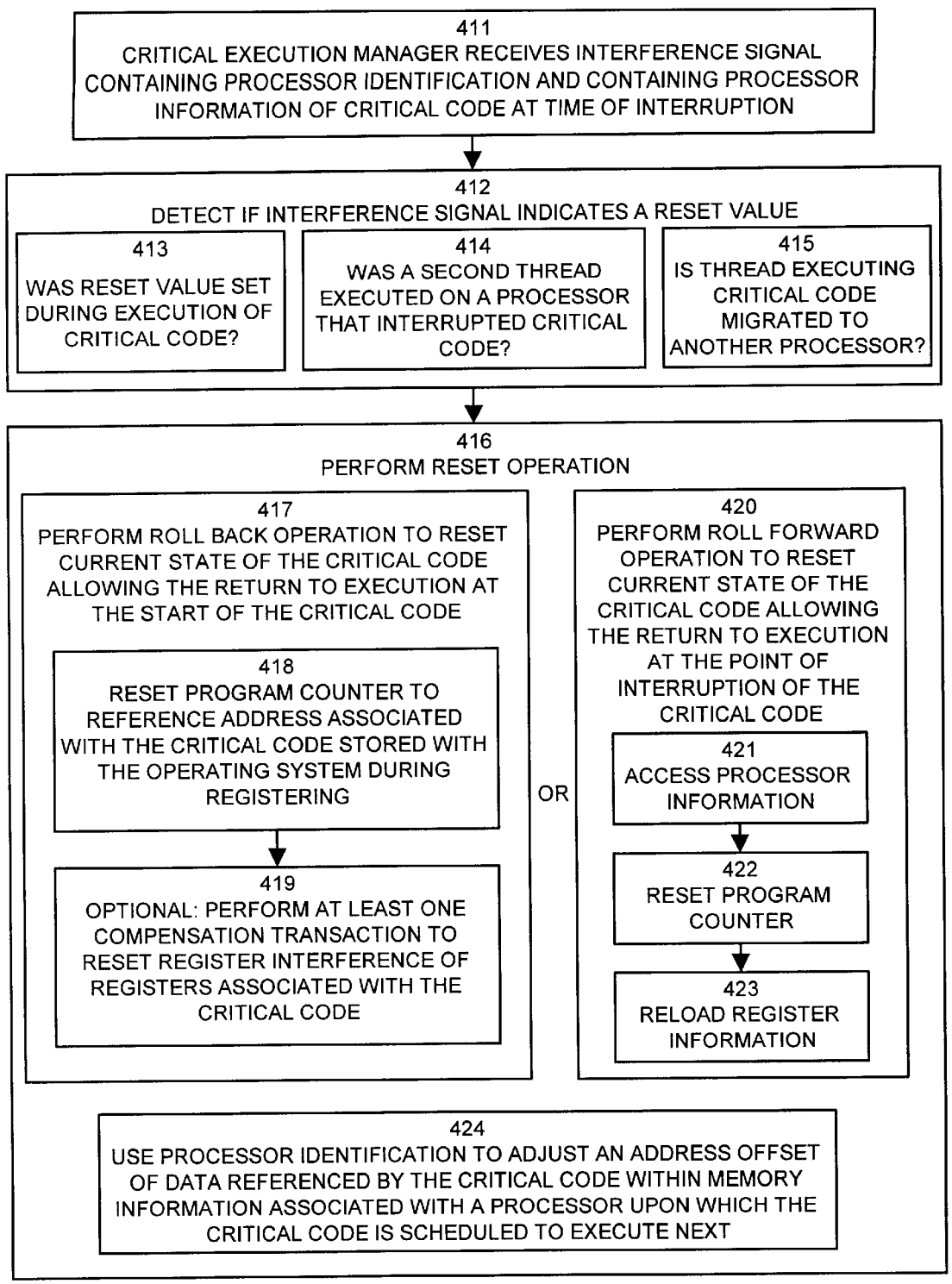

Directing attention now to the continuation of processing at step 411 at the top of FIG. 6, the critical execution manager interference signal detector 140-3 receives the interference signal 163 containing processor identification information 330 and containing or otherwise identifying the first thread saved state information 341 maintained within the operating system 130. That is, in this example embodiment of the invention and as illustrated in FIG. 4 at locations 163 and 357, the critical execution manager interference signal detector 140-3 receives the processor identification 330 within the interference signal 163. This signal can also identify the kernel data structures 341 or first thread saved state that includes the saved state of the interrupted process (the first thread 150-1 in this example). As a result of receiving this information, the critical execution manager interference signal detector 140-3 is able to determine which processor 110-1 or 110-2 the critical code 160 is scheduled (i.e., by the operating system) to execute upon next and is able to access the kernel and/or registered or first thread saved state information 341 that existed (or that was registered) prior to the interruption of the critical code 160 and that was saved during registration.

In step 412, the critical execution manager reset operator 140-2 operates the interference signal detector 140-3 (illustrated in FIGS. 3 and 4) in order to detect if the interference signal 163 indicates a reset value. As noted above, the interference signal 163 contains or provides a pointer to the first thread saved state information 341, which may contain values copied from kernel data structures and/or registration information (i.e., first thread saved state). Accordingly, in step 412, if the critical execution manager interference signal detector 140-3 determines that a program counter or instruction pointer within the saved state references or contains an address of an instruction that exists within the address range of the registered critical code 160, then the critical execution manager interference signal detector perator 140-3 can infer or determine that the interruption took place during execution of a critical code instruction. In other words, since the critical code 160 is registered with the critical execution manager registrar 141 in order to save the address range of critical code instructions associated with the first thread 150-1, then upon occurrence of the interruption, the critical execution manager interference signal detector 140-3 can compare the instruction pointer of the interrupted instruction with the address range of the critical code to determine if the interrupted instruction is part of a critical code. Other techniques as noted above can be used to determine that critical code was being executed at the time of interruption.

Once it is determined that the interruption occurred during operation or execution of the critical code, the critical execution manager interference signal detector 140-3 performs one or more of steps 413 through 415 to determine if the interference signal indicates a reset value. In a conservative implementation as illustrated in step 413 in FIG. 6, the critical execution manager interference signal detector 140-3 determines if the reset value was set during execution of the critical code. This may be done when the critical execution manager interference signal detector 140-3 simply identifies that the critical code 160 was interrupted. Alternatively, an instruction such as a critical code flag instruction may have to have been executed within the critical code in order to set a flag or other signal or value indicating that the interrupted instruction is part of the critical code 160.

In another embodiment of the invention shown in step 414, the critical execution manager interference signal detector 140-3 can determine if a second thread executed on a processor that interrupted the critical code. In such a case, it may be that interference is caused by the second thread (e.g., 150-2, also registered to access the critical code in this example) referencing processor or memory information 115, 170 related to the critical code 160.

In yet another embodiment of the invention as illustrated in step 415, the critical execution manager reset operator 140-3 can determine if the thread containing the critical code 160 has been scheduled for migration to another processor (e.g., 110-2) other than the processor (e.g., 110-1) upon from which it was interrupted.

It is to be understood that these are examples of techniques for determining that an interference signal 163 indicates a reset value in which case the critical execution manager reset operator 143 performs a reset operation. Other techniques may be used as well to determine that interference may be present upon attempting to return to execution of critical code that was interrupted for any reason. Any of such techniques may be employed to set the value of interference signal 163 to indicate a reset value or to otherwise trigger, in some other manner, operation of the critical execution manager reset operator 140-3 in order to perform a reset operation.

In step 416, the critical execution manager reset operator performs a reset operation as indicated at location 358 in FIG. 4. According to different embodiments of the invention, the reset operation may be carried out using a roll-back operation or a roll-forward operation as respectively illustrated by steps 417 and 420 in FIG. 6.

In the roll-back operation technique as illustrated in step 417, the critical execution manager reset operator 143 performs a roll-back operation to reset the current state of the critical code to allow execution to return to the start of the critical code 160. This was illustrated above with respect to FIG. 3 at location 256-1.

Details of one embodiment of a roll-back operation are illustrated with respect to steps 418 and 419 in FIG. 6.

In step 418, the roll-back operation includes resetting a program counter to reference an address (e.g., a starting address) associated with the critical code stored within the operating system during the registering process. This address may be the beginning address of the first instruction of the critical code. Accordingly, step 418 modifies a program counter which references the instruction that was interrupted to now reference an instruction existing at the beginning of the critical code.

Next, in step 419, an optional procedure is performed according to one embodiment of the invention in which the critical execution manager reset operator 143 performs at least one compensation transaction to reset register interference of registers associated with the critical code that were disturbed or otherwise modified by the interruption. In particular, in step 419, the compensation transaction (one or more) is performed to undo or reverse any modification to register contents associated with the critical code that may have resulted due to the interruption in order to bring the register contents back to the way it existed at the start of the critical code 160.

To illustrate the usefulness of a compensation transaction, consider the following scenario: in a roll-back operation that does not utilize a compensation transaction, the program counter is reset to point to be the beginning of the critical code. Then, upon returning to execution of the critical code, processing can proceed using the current set of register values associated with the critical code. However, certain register values may have been modified during processing which occurs during the interruption, or alternatively, the register contents associated with the critical code is only as good as the contents which existed just prior to the interruption, as saved by the kernal. In such cases, the operation of step 419 of performing one or more compensation transactions can be used to reverse effects on interruption processing which modified contents of registers associated with the critical code. Alternatively, compensation transactions can be used to undo register operations of the critical code to revert the register state to the way it existed at the time of the beginning of the critical code. In this manner, the critical code can execute from its beginning due to the processing of step 418 and step 419 and the register contents is accurately represented for use by the critical code 160.

According to the roll-forward operation illustrated in step 420, the critical execution manager reset operator 143 can perform a roll-forward operation to reset the current state of the critical code to allow the return to execution of the critical code at the point of interruption of the critical code. This is illustrated in FIG. 3 as discussed above at location numeral 256-2. According to the role forward technique, processing does not revert to the beginning of the critical code 160. Instead, register and processor information and program counter information are reset as obtained from the first thread saved state information 341 saved in response to the kernel interrupt handler 350 processing the interruption of the critical code 160 at location 354 in FIG. 4. In other words, the roll-forward operation can rely on the kernel data structures which maintain the state of an interrupted process in order to refresh the state (registers, program counter, flags, etc.) prior to beginning execution of the critical code processing at the point in which it was interrupted.

Accordingly, in step 421, the critical execution manager reset operator 143 accesses processor information related to the interrupted thread 150-1 as saved within the first thread saved state information 341. This processor information can include register values, flag values, program or instruction pointer information and other information that is related to the execution of the critical code immediately prior to the interruption.

Next, in step 422, the role forward operation resets the program counter for the critical code to reference the instruction that was interrupted.

Next, in step 423, the critical execution manager reset operator 143 reloads register information obtained from access to the stored processor information (e.g., stored in 341) from step 421. Essentially then, the roll-forward operation is similar to conventional operating system techniques for returning to execution of an interrupted process by referencing the former program counter information and register information associated with the process in order to begin execution of the process again, except that the roll-forward reset operation can further rely on step 424, to be discussed next, in order to avoid interference from the interruption.

After either the roll-forward or roll-back operation has been completed in order to reset the current state of the critical code to execution point, in step 424, the reset operation is continued by the critical execution manager reset operator 143 which uses processor identification information 330 received in interference signal 163 to adjust an address offset of data referenced by the critical code 160 within memory information 170 associated with a processor 110 upon which the critical code 160 is scheduled to execute next. In other words, the processor identification 330 received within the interference signal 163 allows the critical execution manager reset operator 140-3 to insure that memory references made by the critical code 160 upon re-execution properly correspond to memory information 170 associated with the appropriate processor 110 which is to next execute the critical code. As an example, if the critical code 160 is migrated to execute on another processor that is different from the processor upon which the critical code was interrupted from, the identity of this new processor which is to execute the critical code can be utilized by the critical execution manager reset operator 143 in step 424 to adjust offsets for all memory addresses that reference memory locations within the new set of memory information 170 that is respectively related to the new processor which is to execute the critical code. Since offsets to data structures utilized by critical code can be different in each set of memory information 170 which is respectively associated with a distinct respective processor 110, the processor identification can be used by the critical execution manager 140 in step 424 to adjust such address offsets accordingly.

After processing the reset operation in step 416, processing control is then released from the critical execution manager reset operator 143 to return to execution of the critical code 160 is shown at location 359 within FIG. 4.

In this manner, the aforementioned techniques allow for execution of critical code while sustaining interruptions to the critical code and while also avoiding interference caused by such interruptions. In addition, no locking or unlocking techniques are required for operation of embodiments of the invention and thus conventional techniques that present problems such as a convoy problem are avoided. Further still, since portions of the critical execution manager 140 can operate with the user space, embodiments of the invention make atomic execution of critical code fully available to user processes. Further still, embodiments of the invention do not rely upon placement of predefined values into memory locations that can be modified by interrupt processing which then must be tested upon return to critical code.

The following appendix (Appendix A) contains the contents of a paper describing operational details and advantages of certain embodiments of the invention. The contents of the appendix and its teachings are to be considered part of the specification and detailed description of embodiments of the invention disclosed herein. It is also to be understood that embodiments of the invention described in this appendix a net intended to be limiting of any of the other embodiments discussed above.

Those skilled in the art will understand that there can be many variations made to the embodiments explained above while still achieving the same objective of those embodiments and the invention in general. Such variations are intended to be covered by the scope of this invention. As such, the foregoing descriptions of embodiments of the invention are not intended to be limiting. Rather, any limitations to the invention are presented in the claims that follow Appendix A.

APPENDIX A

The following paper entitled "ACCURATE PER-PROCESSOR RESOURCE ALLOCATION IN THE PRESENCE OF PREEMPTION" is to be considered part of the disclosure of the present invention and describes example embodiments thereof.

Attorney Docket No.: SUN01-14(P6372)

- 43 -

Accurate Per-Processor Resource Allocation in the Presence of Preemption[*]

David Dice
Sun Microsystems
1 Network Drive
Burlington, MA 01803-0902
dave.dice@sun.com Alex Garthwaite
Sun Microsystems Laboratories
1 Network Drive
Burlington, MA 01803-0902
alex.garthwaite@sun.com

ABSTRACT
We present a technique that allows user-level threads to manipulate per-CPU resources—for example, allocation buffers—without synchronization. The technique supports notification of a thread as it migrates back onto a processor and allows the execution of compensation code to roll back any aborted transactions as well as the updating of the thread's state to reflect the resources of the CPU it is now on. We describe the design and implementation of our technique in a Java™ virtual machine and provide preliminary performance results demonstrating the benefits of our approach.

1. INTRODUCTION

Like many high-level languages, the Java™ programming language [15, 21] relies on automatic memory management [34, 35, 18] to ensure that newly allocated memory accessed by executing programs is well-formed and to ensure that only provably unreachable memory is freed for reuse. At the core of most memory managers is a shared heap in which objects are allocated. Synchronization on this shared resource represents one potential bottleneck to scalable systems. In addition, the popularity of the Java programming language, particularly for large server applications, has meant that memory management services must scale well to large memories with potentially non-uniform access costs.

Recent efforts on the ML/OS [28] and on the implications for memory management of the Intel IA64 architecture [17] have investigated some interesting approaches for allocating memory efficiently from shared heaps. However, the work on ML/OS is currently restricted to uniprocessors while the IA64 effort describes, but does not implement, techniques that are largely specific to the IA64 architecture and require ABI and operating systems support to reserve and manipulate specific conditional registers. This paper describes the design and implementation of a technique for on-processor notification of a thread's location. We use this mechanism to implement per-CPU resource allocation even in the presence of preemption.

The challenge of supporting scalable memory management will only increase as processor and memory speeds diverge, as cache designs become ever more complicated, and as non-uniform memory access becomes the norm whether on the die with threaded CPUs or on large-scale NUMA architectures. Our mechanism both helps address these issues through the support of efficient access to per-CPU resources and generalizes to other notions of locality such as a die or a node in a NUMA system.

What we present, then, is a mechanism that:

- allows notification to threads as they migrate onto processors,

---
[*]Sun, Sun Microsystems, Java, HotSpot, Solaris, and Ultra are trademarks or registered trademarks of Sun Microsystems, Inc. in the United States and other countries. All SPARC trademarks are used under license and are trademarks or registered trademarks of SPARC International, Inc. in the United States and other countries. Products bearing SPARC trademarks are based upon an architecture developed by Sun Microsystems, Inc.

Attorney Docket No.: SUN01-14(P6372)

- 44 -

- supports the rolling back of transactions aborted by processor migration,
- informs threads as to which processors they are running on,
- makes no changes to the existing operating system, and
- does not compromise the operating system's need to be able to preempt threads even in the kernel.

Using this mechanism, we implement support for per-CPU local allocation buffers (*LABs*)—pools of memory from which a thread may allocate without the use of expensive synchronization—in a high-performance Java virtual machine and compare their performance against the existing highly tuned mechanism based on per-thread LABs. Using our technique, we are able to show that on several benchmarks, we show a significant benefit through allocation from per-CPU LABs. The strongest benefit observed is shown to be a reduction in the rate of per-CPU cache line invalidation and eviction.

1.1 Roadmap

The remainder of this paper is organized as follows. In the next section, we motivate the need for supporting notification of thread migration and for per-CPU resource allocation. In the next two sections, we offer an overview of the design and implementation of these techniques. We then provide data from benchmarks supporting our approach. Finally, we relate our efforts to related work, outline areas for further work and investigation, and conclude.

2. MOTIVATION

In the small scale, the rate at which processors speed up continues to increase with respect to memory speed. In the large scale, large servers are moving to increasingly sophisticated communication architectures with an every deeper memory hierarchy. The net result is that costs of accessing memory increasing dominate application performance.

One area where memory effects are increasingly important is in the runtime systems of high-level languages that rely on automatic memory management. These services must be sensitive to memory allocation in order to achieve good, scalable performance. This trend will likely only increase as we see the advent of threaded dies and NUMA architectures.

2.1 The ResearchVM

The work in this paper has been done in the context of the ResearchVM[1] [1, 3, 11, 2, 33]. The ResearchVM provides a memory management interface allowing one of a range of collection policies to be chosen when the application starts. By default, it provides a two-generation heap with a highly tuned per-thread LAB scheme so that most allocation requests are satisfied without any synchronization. Unfortunately, this scheme only works well in situations where there are not many more threads than processors or where threads are infrequently preempted by the kernel. Per-CPU LABs rectify these short-comings by ensuring that allocatable memory is only associated with actively running threads.

There are a number of options, shown in Figure 1, one might consider for supporting efficient allocation from a shared heap:

no LABs Aside from simplicity, this approach provides the benefit that all unallocated memory is available for any particular allocation request. The fast-path allocation sequence in the ResearchVM uses an atomic instruction, *compare-and-swap* [32], in order to be mostly lock-free.

per-thread LABs Per-thread LABs are associated with individual threads. They have the benefit that while the LABs themselves are carved out of the shared heap like any other direct allocation, most small allocations are satisfied without further synchronization. By associating allocatable memory with an individual thread, however, this memory becomes inaccessible to other threads even if its owning thread is suspended.

per-thread LABs with stealing This approach attempts to overcome some of the deficiencies of per-thread LABs by allowing partially-filled used LABs to be exchanged among threads. This may involve a thread actively stealing another thread's LAB or it may use a cooperative exchange where threads relinquish partially-filled LABs whenever performing an operation that might block. However, this optimization typically introduces additional synchronization overhead to handle the exchange and only helps in cases where the threads are both executing or where a thread has knowledge that it may soon block. It offers no help in cases where a thread is arbitrarily preempted.

M-to-C LABs The *M-to-C* threading model allows the JVM to schedule application threads over roughly a constant number of native threads. In this model, we can associate LABs with the *C* native threads which act, in effect, like virtual processors. Because we have control over the scheduling of application threads, we can either defer preemption during the execution of critical sections or support some protocol for rolling back threads in such transactions. This approach, however, adds complexity to the JVM duplicating services already provided by the underlying operating system and threading library.

per-CPU This approach associates each LAB with a particular CPU and allows a thread executing on a CPU to manipulate that CPU's resources without further synchronization. Clearly, this requires a protocol so that preempted or migrating threads do not update the state of the resources based on stale information.

Attorney Docket No.: SUN01-14(P6372)

- 45 -

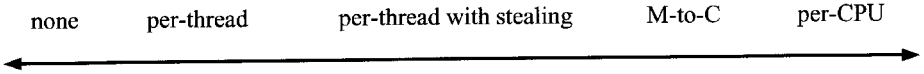

Figure 1: Kinds of Local-Allocation Buffers

The focus of this paper is this last approach. By relying on the underlying threading libraries, we simplify the design of JVM. By providing support for per-CPU LABs for most allocations, we limit the application's exposure to poor scheduling anomalies.

2.2 Challenges and Benefits

We have two sets of requirements. The first is that the kernel must provide appropriate notification so that no thread executes an allocation with stale information. This notification is further constrained in that we need to preserve the efficiency and scalable properties of the kernel especially for applications that do not make use of the new services. In particular, the kernel must still be able to preempt threads without additional cost. The second is that the resulting runtime system services must be efficient, and so, minimize the need for synchronization and maximize the use of available resources.

If we succeed, however, the benefits should be great. By constraining the number of LABs available at any one time and by associating these with CPUs, we can:

- allow larger LABs,
- support faster allocation and initialization,
- generate less cache coherency traffic, and
- through more efficient LAB use, reduce the time spent in collection.

The first two points mean that we need to allocate—or refill—LABs less frequently and that we can satisfy a wider range of allocation requests through the LAB mechanism. The third, exploiting properties of the *MOESI* cache coherency protocol [29, 10], allows for fewer invalidation transactions on the bus since the LABs are tied to individual CPUs. The fourth point results from the fact that we have more control in ensuring that actively executing threads can access allocatable memory.

3. DESIGN

At the heart of our approach is the need to notify threads as they migrate onto processors and to register actions that should be taken when this happens. What we would ideally like is something like the approach shown in Figure 2. Unfortunately, such an approach would require extensive modifications to the kernel for a service that not all processes will need. The modifications would be required so that, while in the kernel, we could access the appropriate parts of a particular user-level thread's context. So, to implement this service, we must look for an alternative approach.

3.1 Kernel Support

Our requirements are:

- that we modify the kernel and its critical paths as possible,
- that we continue to support its preemption model,
- that threads may optionally register for one or more actions,
- that participating threads using proper transactions may safely access per-CPU resources, and
- that all of this may be done efficiently.

These requirements are no small order. For example, they restrict the amount of work, if any, that threads are allowed to do when preempted. Fortunately, there is a hook in the kernel scheduling mechanism that supports precisely the kind of notification we need. The hook in question was originally designed to allow monitors to sample the hardware performance counters on processors so that the sampled values could be associated with particular user-level threads.

The hook detects whether a particular kind of device driver has been registered for a particular thread as that thread is about to transition from kernel-mode back into user-mode. In effect, we use these hooks to register a limited kind of *scheduler activation* [5, 30]. Threads register Attorney Docket No.: SUN01-14(P6372)

- 46 -

Kernel mode

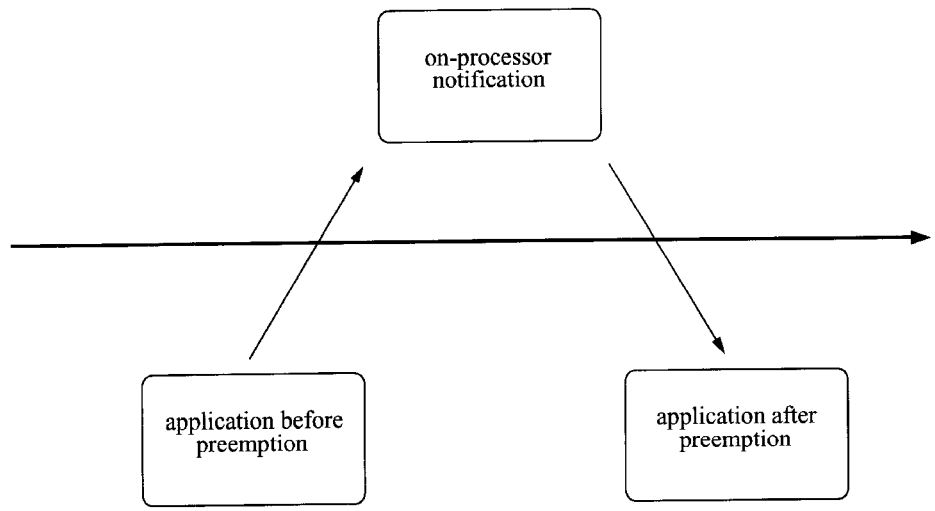

User mode

Figure 2: Ideal Preemption Notification their interest in the service through ioctl calls to the device driver. Using this mechanism, we have implemented accurate thread-level management of per-CPU resources using on-processor notification as shown in Figure 3.

In order to access an interested user-level thread's structures, the simplest approach is to transition temporarily to user-mode. To make this work in the presence of preemption, we save appropriate thread state using the *thread-specific data* (or TSD) facility available to device drivers running under SunOS™ [23] and we set a flag in the thread to indicate that it has made this temporary transition. Once in user-mode, there are two separable tasks: roll back any transactions that must be aborted and, having done that, updating the thread's state to reflect the resources of the processor on which it is running. When we transition from kernel-mode to user-mode, we pass the CPU identifier as a hint. The thread passes this hint to the registered callbacks which are then able to adjust the thread's state. Finally, we use an ioctl call to commit the updates and verify that we are still on the expected CPU. If this turns out not to be the case, the ioctl returns with a new hint for the current CPU's identifer. Otherwise, we restore the thread's context and let it return normally.

The only remaining requirement is to determine when a thread is in a critical section. For expedience, we have currently chosen to register each critical section together with its address bounds. Shivers et al. [28] suggest a number of other methods for detecting such conditions.

3.2 Memory System

This approach places several constraints on the actions that may be taken by the registered resource-related callbacks. Due to the possibility of preemption, these callbacks should be idempotent and must take care to avoid visible side-effects outside a particular thread's state. Further, they must not change the inputs to the transaction in case it must be restarted. We have ideas on how to relax this last constraint but due to lack of time have not been able to explore them yet.

Because we rely on on-processor notification, allocation sequences interrupted by processor migration or processor preemption—the first state indicating that a thread has shifted processors and the second indicating that a thread is coming back on the same processor after being ---
[1] Formerly known as either the ExactVM or the EVM, the ResearchVM currently ships as the Solaris™ Production Release SDK2.

Attorney Docket No.: SUN01-14(P6372)

- 47 -

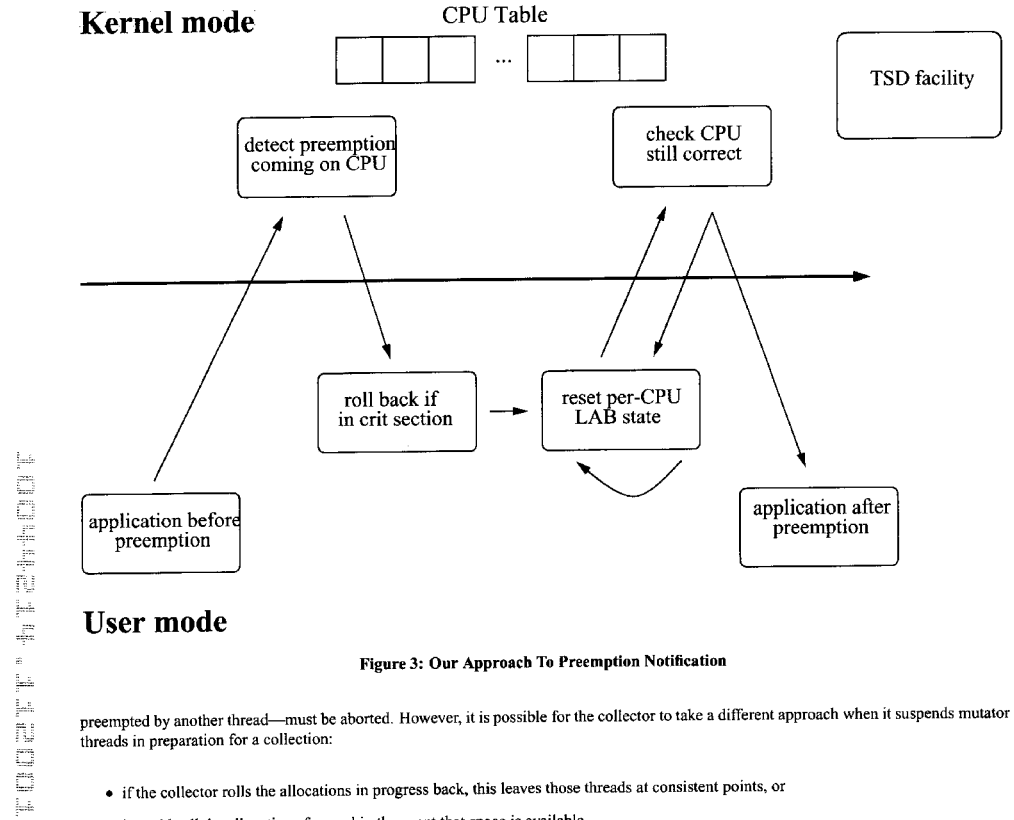

Figure 3: Our Approach To Preemption Notification preempted by another thread—must be aborted. However, it is possible for the collector to take a different approach when it suspends mutator threads in preparation for a collection:

- if the collector rolls the allocations in progress back, this leaves those threads at consistent points, or

- it could roll the allocations forward in the event that space is available.

The latter approach is more difficult because the collector will also have to let the object be initialized in some minimal fashion before the allocating thread can again be considered at a consistent point.

4. IMPLEMENTATION
4.1 Notification of Preemption or Migration
We have implemented user-level notification as follows:

A thread, executing in user-code enters the kernel via a trap or interrupt. The user-level registers are saved in a per-thread kernel structure (in particular the are stored in the savepc and savenpc fields, respectively).

In the kernel, in our context-switch callback we recognize that the current thread has been preempted by other JVM threads (other JVM threads have run on this CPU since this thread last ran), or that this JVM thread has migrated between CPUs. If either of these is the case, and a per-thread "Pending" flag is clear, we save the user-level %pc and %npc values in thread-specific kernel storage (called TSD), set the %pc and %npc values to the address of our user-level notification routine, and finally set the pending flag.

```
if (CpuTable[ThisCPU].LastThreadToRun != ThisThread ||
    ThisThread->LastCPU != ThisCPU ) {
        ThisThread->LastCPU = ThisCPU;
        CpuTable[ThisCPU].LastThreadToRun = ThisThread;
```

```
    if (!ThisThread->Pending) {
        ThisThread->Pending = true;
        ThisThread->savepc  = ThisThread->pc;
        ThisThread->savenpc = ThisThread->npc;
    }
}
```

The intent of the `Pending` flag is to prevent nested notification callbacks.

The kernel thread eventually returns to user-mode. Control passes to the address contained in `ThisThread->pc` and `npc`. Instead of resuming at the original %pc and %npc (saved at (1)) we resume in the user-level notification routine.

The user-level notification routine takes the following actions:

1. save the incoming registers on the stack.

2. Determine which CPU we are currently executing on.

3. Given the cpu, update user-level thread local storage (TLS) to point to the appropriate LAB.

4. Walk the user-level stack and adjust the %pc,%npc of any interrupted critical sections to force them to restart.

5. Issue an IOCTL to the kernel to unwind from the notification routine.

The kernel service routine takes the following actions:

1. Verify that the thread is executing on the expected CPU. If not, return to user-level and let the user-level notificaton code update the TLS and retry the IOCTL.

2. Clear the pending flag.

3. Execute a setcontext call to resume execution in user space at:

(a) The original %pc,%npc saved at (1) above.

(b) The restart point of a critical section, if we happened to interrupt such a critical section. The critical section must be written in such a way as to tolerate restart at points within the critical section.

We have preliminary measurements that show that the cost of notification is 18 $\mu$seconds and have found that at least half of this cost is in a call, `getcontext`, used in stack-walking. The information we obtain from this, we also have access to while in the kernel. We plan to pass this information in another global register, %g3, and remove this call. This optimization together with better tuning of the code for notification will improve the performance and behavior of the mechanism.

4.2 Transactions
basic steps (include locking discipline, coding issues for restart)

4.3 Memory Services
For per-CPU LABs, there are two basic services that must be supported:

- allocation from a LAB

- refilling a LAB

In addition, because a side-effect of a collection is the invalidation of existing LABs, the garbage collector must be modified so that all application threads receive proper notification after a collection.

4.3.1 Allocation From A LAB

A slot in the thread's local storage, accessible directly via the %g7 register, holds a pointer to the LAB metadata associated with the CPU on which the thread currently executes. The LAB metadata structure contains a count of available bytes. The metadata stucture itself resides at the end of the LAB and serves as the allocation limit for the LAB.

```
word * LABTryAlloc (size)
    ! Start of critical section: fetch LAB
    ld    [%g7+LABPointer], %g1
    ! Recompute LABAvail; perform limit check
    ld    [%g1+LABAvail], %g2
    subcc %g2, %o0, %g3
    bneg  SlowPath
    add   %g3, %g1, %g4       ! Form return pointer
    ! End of critical section, commit point
    st    %g3, [%g1+LABAvail]
    retl
    mov   %g4, %o0            ! Return pointer SlowPath:
    Attempt to allocate a new LAB for this CPU.
    if that attempt fails, request a garbage collection
    to make room available for a LAB.
```

This fast-path for allocation is slower than what is used for thread-local LABs. In the final version of this paper, we plan to correct this difference.

4.3.2 Refilling LABs

In this paper, we compare two different approaches to supporting LABs: per-thread and per-CPU LABs. Per-thread LABs in the ResearchVM use the following sizing policies. When allocating small requests, allocation is preferentially done from a per-thread LAB. Per-thread LABs start with an initial size (400 bytes) As LABs are exhausted, threads get increasingly large LABs up to a maximum size (4 kilobytes). Because we wished to support much larger LABs and because we did not have time to implement the per-thread policies for per-CPU LAB, we used the following policy for per-CPU LABs. We divide up the youngest generation into two partitions. LABs refilled from the first, roughly 66% of the generation, take a fixed fraction of that partition. After the first partition is exhausted, each request to refill a LAB acquires a fraction of the remainder that is available. In the final version of the paper, we will look at each of these policies as well as a fixed-sized policy to better compare the merits of per-thread and per-CPU LABs.

XXX Explain how the LAB is "locked" while it is refilled.

4.3.3 Collection

XXX Explain collection actions to reset CPU-array LAB data.

5. PERFORMANCE

Here, we present evidence that our technique is beneficial.

5.1 Experimental Setup

For our experiments, we ran our benchmarks on an E6500 with 16 400MHz Ultra II processors and 16GB memory running the Solaris Operating Environment 2.8. We built two versions of the ResearchVM: one that uses thread LABs and one that relies on migration-notification to maintain CPU LABs.

As mentioned before, the ResearchVM's default heap configuration is a pair of generations: a young generation with two 2MB semispaces and an old mark-compact generation that ranges in size from 6MB to 22MB. For our measurements, we used two policies: the existing highly-tuned per-thread LABs and per-CPU LABs based on our technique for on-processor notification. The policy for the per-thread LABs gives each allocating thread an inital size of 100 words and allows this requesting size to grow up to 1000 words. At each collection, all per-thread requesting sizes are reset to the minimum value (100 words). The policy for per-CPU LABs first gives each request a fixed fraction of the total available. Once a specific amount has been handed out from the young generation (currently 2/3rds of the available space), each request begins to get a diminishing fraction of the remaining space. In the final version of this paper, we plan to implement each of these policies for both kinds of LABs. We would also like to vary the size of the young generation to see what impact that has on the two techniques' performance.

5.2 Benchmarks

To demonstrate the benefits of CPU LABs, we rely on three sets of benchmarks: the SPECjvm98 benchmark suite [9], The VolanoMark benchmark [26], and a microbenchmark to measure allocation behavior. For each of the benchmarks, we compare the performance using per-thread LABs with the performance using per-CPU LABs.

Attorney Docket No.: SUN01-14(P6372)

- 50 -

| Benchmark | Description | Number of Threads | Max Live Size (MBytes)[1] | MBytes Allocated[1] | Execution time (seconds) | |
|---|---|---|---|---|---|---|
| | | | | | Thread LABs | CPU LABs |
| _201_compress | Compresses text based on a modified Lempel-Ziv method (LZW). | 1 | 6.7 | 105 | 32.491 | 32.542 |
| _202_jess | The Java Expert Shell System. | 1 | 1.1 | 111 | 14.686 | 14.892 |
| _209_db | Performs multiple queries on an memory resident database. | 1 | 7.2 | 105 | 45.504 | 45.719 |
| _213_javac | The JDK 1.0.2 Java compiler compiling class libraries. | 1 | 6.5 | 61 | 28.398 | 29.041 |
| _222_mpegaudio | Decompresses ISO MPEG Layer-3 audio files. | 1 | insignificant | | | 34.764 | 35.425 |
| _227_mtrt | Two-threaded ray-tracer. | 2 | 3.0 | 147 | 8.548 | 8.593 |
| _228_jack | A Java parser generator. | 1 | 1.2 | 231 | 20.026 | 20.413 |

Figure 4: SPECjvm98 Benchmarks

5.2.1 SPECjvm98

We include the SPECjvm98 benchmarks for two reasons. First, they serve as a baseline for comparing the performance of our systems against other published results. Second, because they are largely single-threaded and because single-threaded applications should do equally well with per-thread and per-CPU LABs, we wish to show that our system does not hurt single-threaded applications—or ones that have roughly the same number of threads as processors—and may even help these.

The SPECjvm98 suite consists of eight benchmarks. We have included all of the SPECjvm98 suite except for _200_check which is too small to be interesting. Of them, only four—_201_compress, _202_jess, _213_javac, and _228_jack—allocate large amounts of data. The first benchmark, _201_compress, is interesting because it allocates many large objects. Both _202_jess and _228_jack primarily allocate short-lived data. Of the benchmarks, only _213_javac exercises the old generation. The benchmark, _209_db, while allocating 105MB of memory, is less interesting than the others because it does most of its allocation when it starts up and initializes its in-memory database. For an in-depth analysis of the behavior of the SPECjvm98 suite, consult the work by Sylvia Dieckman and Urs Hoelzle [12].

As is evident from Figure 4, our technique has almost no degradation when compared with per-thread LABs. While it would be nice to argue that the difference is in the noise, the slowdown appears to be fairly consistently 1-2%. We suspect that this slowdown is real and will be fixed by the less expensive allocation sequence we proposed at the end of the last section. In the final version of this paper, we plan to implement that sequence and confirm this hypothesis.

5.2.2 VolanoMarks

The second benchmark we consider is the VolanoMark version 2.1.2 benchmark [26]. This benchmark is designed to characterize how well Java virtual machines could support the Volano chat server, an application written in the Java programming language that allows clients to exchange instant messages with each other in a dynamically configured number of chat rooms. The benchmark consists of two processes communicating via sockets. The client application generates a specified synthetic load and the goal is to measure end-to-end throughput in messages per second. Both the client and server processes have two threads for every user for every room.

The results of running VolanoMark on our two configurations are shown in Figures 5 and 6. Interestingly, we see a large improvement when the server application uses per-CPU LABs but we see a net loss when the client application uses the same mechanism. Our analysis is preliminary but, again, we feel that the difference lies in the slower allocation path for the per-CPU mechanism. One difference between the client and server processes is that the server is merely acting as a reflecting service while the client is executing code to manage statistics as well as to generate new messages to drive the simulation. In the final version of the paper, we will have a more detailed analysis of these different behaviors.

5.2.3 Allocation Microbenchmark

The third benchmark we considered is a microbenchmark to measure the allocation cost of the two approaches. It essentially allocates a large amount of garbage through a series of requests for objects of a specific size. Here, we ran the benchmark under the two policies and varied the following parameters:

Attorney Docket No.: SUN01-14(P6372)
- 51 -
| Rooms | Client | Server | VolanoMark score |
|---|---|---|---|
| 10 | CPU LABs | Thread LABs | 19,186 |
|  |  | CPU LABs | 19,404 |
|  | Thread LABs | Thread LABs | 24,839 |
|  |  | CPU LABs | 28,193 |
| 50 | CPU LABs | Thread LABs | 18,382 |
|  |  | CPU LABs | 18,132 |
|  | Thread LABs | Thread LABs | 19,084 |
|  |  | CPU LABs | 20,468 |
| 100 | CPU LABs | Thread LABs | 16,556 |
|  |  | CPU LABs | 16,793 |
|  | Thread LABs | Thread LABs | 17,377 |
|  |  | CPU LABs | 19,125 |
Figure 5: VolanoMarks run with 10 users and 100 messages per user.
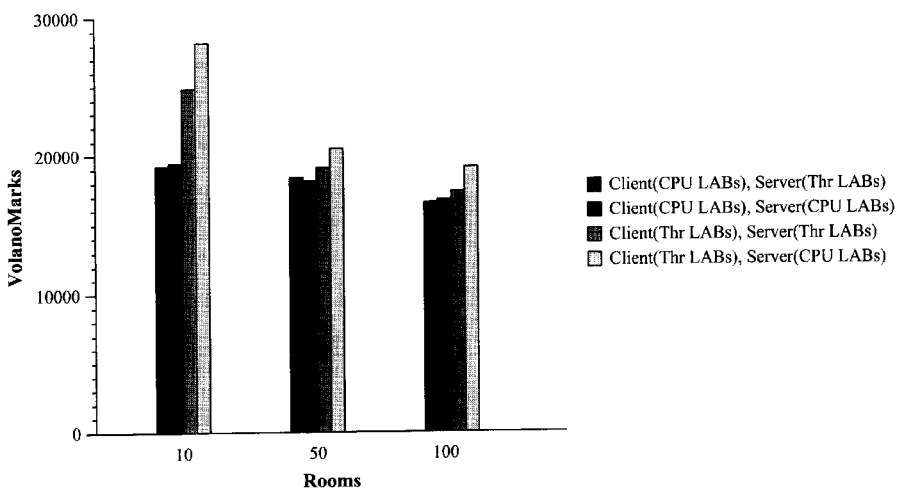
Figure 6: VolanoMarks Attorney Docket No.: SUN01-14(P6372)

- 52 -

| Measurement | 16 Threads | | | | 100 Threads | | | |
|---|---|---|---|---|---|---|---|---|
| | 10-word objects 20,000,000 iters | | 100-word objects 2,000,000 iters | | 10-word objects 2,000,000 iters | | 100-word objects 200,000 iters | |
| | Thr LABs | CPU LABs | Thr LABs | CPU LABs | Thr LABs | CPU LABs | Thr LABs | CPU LABs |
| Elapsed time (ms) | 16,145 | 21,250 | 31,320 | 24,128 | 15,512 | 16,022 | 25,316 | 18,312 |
| Cycles per inst | 4.15 | 4.07 | 16.46 | 9.79 | 3.73 | 3.80 | 11.84 | 8.48 |
| Cache invalidations | 127,767,916 | 118,148,233 | 247,330,163 | 141,618,296 | 64,535,493 | 63,051,954 | 126,435,802 | 70,830,009 |
| Copybacks | 126,895,458 | 115,902,364 | 232,824,680 | 140,541,283 | 64,321,948 | 61,904,418 | 120,287,311 | 70,393,390 |

Figure 7: Allocation Microbenchmark: 16 CPUs

| Event | 16 Threads | | 100 Threads | |
|---|---|---|---|---|
| | 10-word objects 20,000,000 iters | 100-word objects 2,000,000 iters | 10-word objects 2,000,000 iters | 100-word objects 200,000 iters |
| Migration | 514 | 731 | 1,199 | 1,838 |
| Preemption | 6,966 | 10,099 | 70,155 | 12,245 |
| Aborts | 4 | 66 | 5 | 38 |
| Accumulated stackframe depth | 678 | 1,310 | 203 | 440 |

Figure 8: Allocation Microbenchmark: 16 CPUs

- 1, 2, 4, 8, and 16 CPUs,
- two object sizes (10 words and 100 words)
- two numbers of threads ($P$ where $P$ is the number of CPUs and 100 threads)

We further gathered statistics for the average cycles-per-instruction, cache-coherence traffic, preemption and migration rates, number of times transactions had to be rolled back, number of stack frames beyond the top one that were traversed, and elapsed times. The results may be seen in Figures 7 through 16.

The most interesting conclusions that may be drawn from this data are that:

- under high thread-to-CPU ratios, our technique does significantly better than per-thread LABs as expected,
- much of the benefit can be seen in the lower CPI and reduced invalidation traffic for the per-CPU LABs scheme, and
- the default time-sharing scheduling mechanism does a good job of preserving processor affinity when scheduling threads.

The reduce cache invalidations are likely due to the fact that separate LABs remain isolated in separate processor caches, that there is little sharing among threads, and that as a result the cache coherence protocol is able to determine that cache lines associated with LABs are largely owned by specific processors. It should also be noted how rarely allocation transactions are aborted and how few stack frames beyond the first one need to be considered in spite of the fact that the threads do little besides allocating objects in a tight loop.

Three aspects that we failed to capture in these data are the effect of scheduling affinity on the two approaches, the fragmentation induced in the young generation by the two approaches to LABs, and the effectiveness of the LAB-refilling transactions. In the final version of the paper, we plan to address these deficiencies and provide graphs instead of the existing tables.

| Measurement | 16 Threads | | | | 100 Threads | | | |
|---|---|---|---|---|---|---|---|---|
| | 10-word objects 20,000,000 iters | | 100-word objects 2,000,000 iters | | 10-word objects 2,000,000 iters | | 100-word objects 200,000 iters | |
| | Thr LABs | CPU LABs | Thr LABs | CPU LABs | Thr LABs | CPU LABs | Thr LABs | CPU LABs |
| Elapsed time (ms) | 35,797 | 33,682 | 50,398 | 35,518 | 21,338 | 20,714 | 31,752 | 22,908 |
| Cycles per inst | 3.36 | 3.34 | 10.25 | 7.95 | 3.52 | 3.51 | 10.53 | 7.98 |
| Cache invalidations | 76,347,350 | 78,964,176 | 177,668,776 | 97,736,197 | 65,970,669 | 62,367,790 | 125,958,616 | 75,132,698 |
| Copybacks | 76,298,739 | 78,462,877 | 172,983,160 | 97,552,560 | 65,930,580 | 61,811,363 | 122,036,412 | 74,957,986 |

Figure 9: Allocation Microbenchmark: 8 CPUs

Attorney Docket No.: SUN01-14(P6372)

- 53 -

| Event | 16 Threads | | 100 Threads | |
|---|---|---|---|---|
| | 10-word objects 20,000,000 iters | 100-word objects 2,000,000 iters | 10-word objects 2,000,000 iters | 100-word objects 200,000 iters |
| Migration | 1,994 | 2,058 | 1,824 | 1,437 |
| Preemption | 11,030 | 13,394 | 10,146 | 9,274 |
| Aborts | 19 | 65 | 10 | 41 |
| Accumulated stackframe depth | 271 | 571 | 307 | 331 |

Figure 10: Allocation Microbenchmark: 8 CPUs

| Measurement | 16 Threads | | | | 100 Threads | | | |
|---|---|---|---|---|---|---|---|---|
| | 10-word objects 20,000,000 iters | | 100-word objects 2,000,000 iters | | 10-word objects 2,000,000 iters | | 100-word objects 200,000 iters | |
| | Thr LABs | CPU LABs | Thr LABs | CPU LABs | Thr LABs | CPU LABs | Thr LABs | CPU LABs |
| Elapsed time (ms) | 44,167 | 44,923 | 61,304 | 45,297 | 29,502 | 29,123 | 40,519 | 29,541 |
| Cycles per inst | 2.93 | 2.89 | 8.37 | 4.29 | 3.10 | 3.05 | 8.69 | 6.67 |
| Cache invalidations | 61,567,286 | 56,334,294 | 4,417,355,219 | 62,249,196 | 51,106,637 | 47,164,319 | 104,496,130 | 54,825,588 |
| Copybacks | 61,648,125 | 56,228,248 | 4,416,022,608 | 62,271,132 | 51,190,604 | 47,074,056 | 103,055,640 | 54,811,992 |

Figure 11: Allocation Microbenchmark: 4 CPUs

| Event | 16 Threads | | 100 Threads | |
|---|---|---|---|---|
| | 10-word objects 20,000,000 iters | 100-word objects 2,000,000 iters | 10-word objects 2,000,000 iters | 100-word objects 200,000 iters |
| Migration | 2,148 | 2,562 | 1,755 | 1,646 |
| Preemption | 12,082 | 14,732 | 8,948 | 10,500 |
| Aborts | 23 | 64 | 14 | 30 |
| Accumulated stackframe depth | 20 | 64 | 39 | 47 |

Figure 12: Allocation Microbenchmark: 4 CPUs

| Measurement | 16 Threads | | | | 100 Threads | | | |
|---|---|---|---|---|---|---|---|---|
| | 10-word objects 20,000,000 iters | | 100-word objects 2,000,000 iters | | 10-word objects 2,000,000 iters | | 100-word objects 200,000 iters | |
| | Thr LABs | CPU LABs | Thr LABs | CPU LABs | Thr LABs | CPU LABs | Thr LABs | CPU LABs |
| Elapsed time (ms) | 60,705 | 60,037 | 75,216 | 57,462 | 35,944 | 36,515 | 50,197 | 36,526 |
| Cycles per inst | 2.54 | 2.44 | 6.45 | 5.26 | 2.53 | 2.45 | 6.90 | 5.43 |
| Cache invalidations | 32,797,852 | 27,527,846 | 74,322,618 | 30,507,108 | 24,896,931 | 23,679,234 | 65,178,635 | 31,603,180 |
| Copybacks | 32,896,260 | 27,535,014 | 74,474,580 | 30,512,967 | 25,069,345 | 23,663,404 | 65,413,054 | 31,597,742 |

Figure 13: Allocation Microbenchmark: 2 CPUs

| Event | 16 Threads | | 100 Threads | |
|---|---|---|---|---|
| | 10-word objects 20,000,000 iters | 100-word objects 2,000,000 iters | 10-word objects 2,000,000 iters | 100-word objects 200,000 iters |
| Migration | 2,431 | 2,706 | 2,246 | 2,038 |
| Preemption | 16,067 | 19,384 | 12,142 | 13,775 |
| Aborts | 26 | 71 | 39 | 52 |
| Accumulated stackframe depth | 16 | 20 | 9 | 11 |

Figure 14: Allocation Microbenchmark: 2 CPUs

Attorney Docket No.: SUN01-14(P6372)

- 54 -

| Measurement | 16 Threads | | | | 100 Threads | | | |
|---|---|---|---|---|---|---|---|---|
| | 10-word objects 20,000,000 iters | | 100-word objects 2,000,000 iters | | 10-word objects 2,000,000 iters | | 100-word objects 200,000 iters | |
| | Thr LABs | CPU LABs | Thr LABs | CPU LABs | Thr LABs | CPU LABs | Thr LABs | CPU LABs |
| Elapsed time (ms) | 98,934 | 97,841 | 85,339 | 83,384 | 62,574 | 62,415 | 54,562 | 54,978 |
| Cycles per inst | 2.52 | 2.43 | 4.43 | 4.89 | 2.51 | 2.41 | 4.19 | 4.55 |
| Cache invalidations | 7 | 18 | 14 | 17 | 10 | 12 | 2 | 9 |
| Copybacks | 143 | 38 | 32 | 39 | 11 | 28 | 4 | 8 |

Figure 15: Allocation Microbenchmark: 1 CPU

| Event | 16 Threads | | 100 Threads | |
|---|---|---|---|---|
| | 10-word objects 20,000,000 iters | 100-word objects 2,000,000 iters | 10-word objects 2,000,000 iters | 100-word objects 200,000 iters |
| Migration | 0 | 0 | 0 | 0 |
| Preemption | 60,525 | 49,841 | 31,210 | 24,437 |
| Aborts | 12 | 73 | 5 | 36 |
| Accumulated stackframe depth | 0 | 0 | 0 | 0 |

Figure 16: Allocation Microbenchmark: 1 CPU

6. RELATED WORK

The results in this paper were not developed in a vacuum and we owe much to the work of others.

A primary influence was the paper by Shivers et al. on atomic heap transactions and fine-grained interrupts [28]. In that work, the authors describe their efforts to develop efficient allocation services for use in an operating system written in ML, how these services are best represented as restartable transactions, and how they interact well with kernel's need to handle interrupts efficiently. A major influence on their project is the work done at MIT an the ITS operating system. That operating system used a technique termed PCSLR that ensured that when any thread examined at another thread's state that the observed state was consistent. [6] The basic mechanism was a set of protocols to either roll thread's forward or backward to a consistent point at which they could be suspended. We find it interesting how similar some of these ideas are to the thread suspension techniques used by many Java virtual machines include the HotSpot™ virtual machine [16, 24], the IBM Jalapeno virtual machine [4], the ResearchVM, and others.

One key difference between the Shivers proposal and our work is that because we only rely on on-processor notification and our threads may be preempted at any time—even while in the kernel—we must be defensive when we allocate from a per-CPU LAB and store out the new bounds as the allocation request commits. Our device driver supports off-processor notification and we have thought about using this to preserve a per-CPU frontier-register much like Shivers does but we have not had a chance to investigate this fully.

Hudson et al. propose a number of clever allocation sequences that one may use if one's architecture has many available conditional registers and is willing to follow an ABI that reverses some of these for preemption-notification [17]. Our proposal differs from these techniques mainly in that our processors do not have the same kind of cheap, plentiful conditional registers as are found on the IA64 architecture, and in part because what we have described and implemented in this paper are the necessary runtime services alluded to in the Hudson et al. paper.

Interestingly, it would be straight forward to use our approach on any multi-processor-aware versions of Microsoft Windows 2000 and NT [22]. The same hook, KeSetSwapContext, that is used, for example, by the VTrace tool could be used to implement our technique. In discussions with colleagues, we learned of a number of systems that have provided similar services. The best example of this are the *functional recovery routines* and related mechanisms that allow the implementation of quite sophisticated transactions on the OS/390 MVS operating system [27].

Finally, the IBM Jalapeno virtual machine already implements a kind of M-to-C threading model. Because its runtime system completely controls the scheduling and number of its virtual processors, it would be a straightforward matter for the Jalapeno VM to implement per-virtual-CPU LABs and get many of the benefits we believe would accrue from constraining the number of LABs to roughly the set of actively executing threads.

7. FUTURE PLANS

Throughout this paper, we have mentioned aspects of the work on which we would like to expand. In addition to these, there are a number of possible directions we would like to explore:

- We would like to investigate how one should best tune LAB-sizing policies to both tolerate large LABs but also be sensitive to the efficiency with which the LABs are used.

Attorney Docket No.: SUN01-14(P6372)

- 55 -

- We have implemented our techniques in a runtime system and as such have a fair amount of control over the ABI's that that runtime system uses internally. Recently, our colleague, David Detlefs, implemented mechanisms for reserving registers for use with the runtime system and code that it generates. We plan to use this technique to implement a register-only allocation transaction.

- We plan to continue our study of M-to-C threading models and would like to compare the relative benefits of per-C-thread LABs with per-CPU LABs. In the former case, we have more control over the scheduling of particular tasks on a given LAB but the kernel may reschedule our native threads on different processors over time. In the latter case, we find that LABs become "homed" in particular CPU caches and that this homing effect reduces the cache coherence traffic but we may have many unrelated threads allocating out of the same per-CPU LAB over time.

- We could use our technique to implement synchronization for other per-CPU resources beyond allocation services. For example, we might use static analysis to better schedule a set of threads and, in the process, allow them to use cheaper synchronization primitives on resources they share.

Finally, we would like to consider using our technique for other kinds of allocators including `malloc` libraries. Recently, there has been much work on scalable `malloc` implementations— [8, 14, 7, 23, 25] to name but a few. With the exception of the kernel memory allocator [23], all of these allocators are written without the benefit of on-processor notification and, as a result, even their fast paths typically require the acquisition of at least one lock. We believe that if we are showing benefits in a runtime system whose allocation scheme is already largely unsynchronized in the fast path, we will show an even more dramatic benefit in the case of these libraries.

8. CONCLUSION

We have proposed a technique for allowing user-level threads to manipulate per-CPU resources efficiently. Unlike previous work, our technique works on multiprocessors and in the presence of preemption by the kernel scheduler. Further, the same technique may be extended to track and manage other levels of locality. We have implemented this technique in a Java virtual machine and demonstrated its utility on a small number of benchmarks.

9. ACKNOWLEDGEMENTS

We would like to thank Chris Phillips for pointing us at IBM's use of functional recovery routines and service requests.

Attorney Docket No.: SUN01-14(P6372)

- 56 -

10. REFERENCES

[1] Ole Agesen. GC Points in a Threaded Environment. Technical report, Sun Microsystems Laboratories., December 1998. Technical Report SMLI-TR-98-70.

[2] Ole Agesen and David Detlefs. Mixed-mode Bytecode Execution. Technical report, Sun Microsystems Laboratories., June 2000. Technical Report SMLI-TR-2000-87.

[3] Ole Agesen, David Detlefs, Alex Garthwaite, Ross Knippel, Y. S. Ramakrishna, and Derek White. An Efficient Meta-lock For Implementing Ubiquitous Synchronization. *ACM SIGPLAN Notices*, 34(10):207–222, 1999.

[4] Bowen Alpern, C. Richard Attanasio, John J. Barton, Anthony Cocchi, Susan Flynn Hummel, Derek Lieber, Ton Ngo, Mark F. Mergen, Janice C. Sheperd, and Stephen Smith. Implementing Jalapeno in Java. In *OOPSLA '99 ACM Conference on Object-Oriented Systems, Languages and Applications*, volume 34(10) of *ACM SIGPLAN Notices*, pages 314–324, Denver, CO, October 1999. ACM Press.

[5] T. Anderson, B. Bershad, E. Lazoswka, and H. Levy. Scheduler Activations: Effective Kernel Support for the User-Level Management of Parallelism. *ACM Transactions on Computer Systems*, 10(1):53–79, February 1992.

[6] Alan Bawden. PCLSRing: Keeping Process State Modular. Available at ftp://ftp.ai.mit.edu/pub/alan/ pclsr.memo, 1993.

[7] Emery Berger, Kathryn McKinley, Robert Blumofe, and Paul Wilson. Hoard: A scalable memory allocator for multithreaded applications. In *ASPLOS-IX: Ninth International Conference on Architectural Support for Programming Languages and Operating Systems*, Cambridge, MA, November 2000.

[8] Jeff Bonwick. The Slab Allocator: An Object-Caching Kernel Memory Allocator. In *USENIX Summer*, pages 87–98, 1994.

[9] Standard Performance Evaluation Consortium. SPECjvm98 Benchmarks, August 1998. Available at: http://www.spec.org.

[10] D. Culler, J. Singh, and A. Gupta. *Parallel Computer Architecture: A Hardware/Software Approach*. Morgan Kaufman, 1999.

[11] David Detlefs and Ole Agesen. Inlining of Virtual Methods. In ECOOP [13], pages 258–278.

[12] Sylvia Dieckman and Urs Hölzle. A Study of the Allocation Behaviour of the SPECjvm98 Java Benchmarks. In ECOOP [13], pages 92–115.

[13] *Proceedings of 13th European Conference on Object-Oriented Programming, ECOOP99*, Lisbon, July 1999.

[14] Wolfram Gloger. PTMalloc–A Multi-threaded Malloc Implementation. Available at: ftp://ftp.dent.med.unimuenchen.de/pub/wmglo/ptmalloc.tar.gz, April 1997.

[15] James Gosling, Bill Joy, Guy Steele, and Gilad Bracha. *The Java™Language Specification, Second Edition*. The Java Series. Addison-Wesley, June 2000.

[16] The Java™Hotspot™Performance Engine Architecture, 1999. Available at: http://java.sun.com/products/hotspot/whitepaper.html.

[17] Richard L. Hudson, J. Eliot B. Moss, Sreenivas Subramoney, and Weldon Washburn. Cycles to Recycle: Garbage Collection on the IA-64. In Tony Hosking, editor, *ISMM 2000 Proceedings of the Second International Symposium on Memory Management*, volume 36(1) of *ACM SIGPLAN Notices*, Minneapolis, MN, October 2000. ACM Press.

[18] Richard E. Jones. *Garbage Collection: Algorithms for Automatic Dynamic Memory Management*. Wiley, July 1996. With a chapter on Distributed Garbage Collection by R. Lins.

[19] Doug Lea. A Java Fork/Join Framework. In *Java Grande*, pages 36–43, 2000.

[20] Henry Lieberman and Carl E. Hewitt. A Real-Time Garbage Collector Based on the Lifetimes of Objects. *Communications of the ACM*, 26(6):419–429, 1983. Also report TM–184, Laboratory for Computer Science, MIT, Cambridge, MA, July 1980 and AI Lab Memo 569, 1981.

[21] Tim Lindholm and Frank Yellin. *The Java™Virtual Machine Specification, Second Edition*. The Java Series. Addison-Wesley, Reading, MA, USA, April 1999.

[22] Jacob Lorch and Alan Jay Smith. The VTrace Tool: Building a System Tracer for Windows NT and Windows 2000. *MSDN Magazine*, October 1999.

[23] Jim Mauro and Richard McDougall. *Solaris™Internals: Core Kernel Architecture*. Sun Microsystems Press. Prentice-Hall, 2001.

[24] Steve Meloan. The Java HotSpot™Perfomance Engine: An In-Depth Look. Article on Sun's Java Developer Connection site, 1999.

[25] Greg Nakhimovsky. Improving Scalability of Multithreaded Dynamic Memory Allocation. *Dr. Dobbs Journal*, to be published, 2001.

[26] John Neffinger. Which Java VM Scales Best? *JavaWorld*, August 1998. See also: http://www.volano.com.

[27] *OS/390 MVS Programming: Resource Recovery*, September 1998. GC28-1739-03.

[28] O. Shivers, J.W. Clark, and R. McGrath. Atomic Heap Transactions and Fine-Grain Interrupts. In *Proceedings of International Conference on Functional Programming*, Paris, September 1999.

[29] P. Sweazey and A. J. Smith. A Class of Compatible Cache Consistency Protocols and their Support by the IEEE Futurebus. In *Proceedings of 13th Annual International Symposium on Computer Architecture, ACM/IEEE*, pages 414–423, Tokyo, June 1986.

[30] Andrew Tucker. Scheduler Activations in Solaris™. Technical report, Sun Microsystems Inc., April 1996. Internal document.

[31] David M. Ungar. Generation Scavenging: A Non-Disruptive High Performance Storage reclamation algorithm. *ACM SIGPLAN Notices*, 19(5):157–167, April 1984. Also published as ACM Software Engineering Notes 9, 3 (May 1984) — Proceedings of the ACM/SIGSOFT/SIGPLAN Software Engineering Symposium on Practical Software Development Environments, 157–167, April 1984.

[32] David L. Weaver and Tom Germond, editors. *The Sparc™Architecture Manual, Version 9*. Prentice Hall, Englewood Cliffs, NJ, 1994.

[33] Derek White and Alex Garthwaite. The GC Interface in the EVM. Technical report, Sun Microsystems Laboratories., 1999. Technical Report SMLI-TR-98-67.

[34] Paul R. Wilson. Uniprocessor Garbage Collection Techniques. In Yves Bekkers and Jacques Cohen, editors, *Proceedings of International Workshop on Memory Management*, volume 637 of *Lecture Notes in Computer Science*, University of Texas, USA, 16–18 September 1992. Springer-Verlag.

[35] Paul R. Wilson. Uniprocessor Garbage Collection Techniques. Technical report, University of Texas, January 1994. Expanded version of the IWMM92 paper.

[36] Paul R. Wilson, Mark S. Johnstone, Michael Neely, and David Boles. Dynamic Storage Allocation: A Survey and Critical Review. In Henry Baker, editor, *Proceedings of International Workshop on Memory Management*, volume 986 of *Lecture Notes in Computer Science*, Kinross, Scotland, September 1995. Springer-Verlag.

What is claimed is:

1. In a computerized device, a method for executing critical code without interference, the method comprising the steps of:

registering the critical code for invocation of a critical execution manager in the event of an interruption to the critical code;

executing critical code until an interruption to the critical code occurs;

after handling the interruption, invoking the critical execution manager, the critical execution manager detecting if an interference signal indicates a reset value, and if the interference signal indicates the reset value, performing a reset operation on the critical code to reset a current state of the critical code to allow execution of the critical code while avoiding interference from handling the interruption; and returning to execution of the critical code using the current state of the critical code.

2. The method of claim 1 wherein the interference signal indicates a reset value in the event of any interruption to the critical code.

3. The method of claim 2 wherein the step of registering the critical code for invocation of a critical execution manager in the event of an interrupt to the critical code comprises the steps of:

storing at least one address associated with the critical code with an operating system in the computerized device, the at least one address indicating a location of the critical code at which the step of returning to execution of the critical code can begin execution; and registering the critical code with the critical execution manager such that the operating system invokes execution of the critical execution manager instead of the critical code after handling the interruption.

4. The method of claim 1 wherein the step of executing the critical code comprises the step of:

setting the interference signal to indicate a reset value by performing at least one of the operations of:

executing a critical code flag instruction upon entry into the critical code to set the interference signal to indicate a reset value;

executing an idiomatic instruction that utilizes critical code registers reserved for the idiomatic instruction, at least one of the critical code registers containing a value at the time of interruption that indicates a reset value; and detecting interruption of the critical code during execution of a blocking call instruction.

5. The method of claim 1 wherein the critical code is referenced in a first thread and wherein the step of detecting if an interference signal indicates a reset value comprises at least one of the steps of:

i) detecting that the interference signal indicates a reset value by examining an interference signal set as a result of the step of execution of the critical code;

ii) detecting that the interference signal indicates a reset value by determining that a second thread was executed on a processor associated with the first thread during handling of the interruption of the first thread containing the critical code; and iii) detecting that the interference signal indicates a reset value by detecting that the first thread containing the critical code has been migrated to a processor that is different that a processor upon which the first thread was executing at a time of the interruption.

6. The method of claim 1 wherein the step of performing a reset operation comprises the step of:

performing a roll-back operation to reset the current state of the critical code based information stored in an operating system in the step of registering the critical code, the roll-back operation allowing the step of returning to execution of the critical code to return to execution of the critical code at the start of a critical section of the critical code.

7. The method of claim 6 wherein the step of performing a roll-back operation comprises the step of:

resetting a program counter for the critical code to reference an address associated with the critical code stored with an operating system in the computerized device during the step of registering the critical code, the address indicating a location of the critical code at which the step of returning to execution of the critical code can begin executions.

8. The method of claim 7 wherein the step of performing a roll-back operation comprises the step of:

performing at least one compensation transaction to reset register interference of registers associated with the critical code.

9. The method of claim 1 wherein the step of performing a reset operation comprises the step of:

performing a roll-forward operation to reset the current state of the critical code to a state saved by an operating system in response to the interruption, the roll-forward operation allowing the step of returning to execution of the critical code to return to execution of the critical code at a point of interruption of the critical code.

10. The method of claim 9 wherein the step of performing a roll-forward operation comprises the steps of:

accessing processor information associated with the critical code from an operating system;

resetting a program counter for the critical code based on the processor information, the program counter referencing an instruction that was interrupted in the critical code;

reloading register information for the critical code based on the processor information, the register information containing register values related to the critical code at the time of interruption; and wherein the step of returning to execution of the critical code begins execution of the critical code at the instruction that was interrupted in the critical code referenced by the program counter for the critical code.

11. The method of claim 1 wherein:

a plurality of processors operate in the computerized device and wherein during handling the interruption, an operating system schedules a thread containing the critical code for execution on a processor that is different than a processor upon which the thread was executing at a time of the interruption;

the step of invoking the critical execution manager comprises the step of receiving a processor identification indicating an identity of the processor upon which the thread is scheduled to execute; and the step of performing a reset operation comprises the step of using the processor identification to adjust an address offset of data referenced by the critical code within memory information associated with a processor upon which the critical code is scheduled to execute next.

12. A computerized device capable of executing critical code without interference, the computerized device comprising:

a processor;
a memory encoded with an operating system, critical code, and a critical execution manager; and
an interconnection mechanism coupling the processor and the memory;
wherein the processor executes critical code causing the processor to perform the operations of:
  registering the critical code for invocation of a critical execution manager in the event of an interruption to the critical code; and
  executing critical code until an interruption to the critical code occurs; and
wherein the processor executes the operating system causing the processor to handle an interruption to the critical code, and wherein after handling the interruption, the processor invokes execution of the critical execution manager causing the processor to perform the operations of:
  detecting if an interference signal indicates a reset value, and if the interference signal indicates the reset value, performing a reset operation on the critical code to reset a current state of the critical code to allow execution of the critical code while avoiding interference from handling the interruption; and
  returning to execution of the critical code using the current state of the critical code.

13. The computerized device of claim 12 wherein the interference signal indicates a reset value in the event of any interruption to the critical code.

14. The computerized device of claim 13 wherein when the processor performs the operation of registering the critical code for invocation of a critical execution manager in the event of an interrupt to the critical code, the processor further performs the operations of:
  storing at least one address associated with the critical code with an operating system in the computerized device, the at least one address indicating a location of the critical code at which the step of returning to execution of the critical code can begin execution; and
  registering the critical code with the critical execution manager such that the operating system invokes execution of the critical execution manager instead of the critical code after handling the interruption.

15. The computerized device of claim 12 wherein when the processor performs the operation of executing the critical code, the processor performs the operation of:
  setting the interference signal to indicate a reset value by performing at least one of the operations of:
    executing a critical code flag instruction upon entry into the critical code to set the interference signal to indicate a reset value;
    executing an idiomatic instruction that utilizes critical code registers reserved for the idiomatic instruction, at least one of the critical code registers containing a value at the time of interruption that indicates a reset value; and
    detecting interruption of the critical code during execution of a blocking call instruction.

16. The computerized device of claim 12 wherein the critical code is referenced in a first thread in the memory and wherein when the processor performs the operation of detecting if an interference signal indicates a reset value, the processor performs at least one of the operations of:
  i) detecting that the interference signal indicates a reset value by examining an interference signal set as a result of the step of execution of the critical code;
  ii) detecting that the interference signal indicates a reset value by determining that a second thread was executed on a processor associated with the first thread during handling of the interruption of the first thread containing the critical code; and
  iii) detecting that the interference signal indicates a reset value by detecting that the first thread containing the critical code has been migrated to a processor that is different that a processor upon which the first thread was executing at a time of the interruption.

17. The computerized device of claim 12 wherein when the processor performs the operation of performing a reset operation, the processor performs the operations of:
  performing a roll-back operation to reset the current state of the critical code based information stored in an operating system in the step of registering the critical code, the roll-back operation allowing the step of returning to execution of the critical code to return to execution of the critical code at the start of a critical section of the critical code.

18. The computerized device of claim 17 wherein when the processor performs the operation of performing a roll-back operation, the processor performs the operation of:
  resetting a program counter for the critical code to reference an address associated with the critical code stored with an operating system in the computerized device during the step of registering the critical code, the address indicating a location of the critical code at which the step of returning to execution of the critical code can begin execution.

19. The computerized device of claim 18 wherein when the processor performs the operation of performing a roll-back operation, the processor performs the operation of:
  performing at least one compensation transaction to reset register interference of registers associated with the critical code.

20. The computerized device of claim 12 wherein when the processor performs the operation of performing a reset operation, the processor performs the operation of:
  performing a roll-forward operation to reset the current state of the critical code to a state saved by an operating system in response to the interruption, the roll-forward operation allowing the step of returning to execution of the critical code to return to execution of the critical code at a point of interruption of the critical code.

21. The computerized device of claim 20 wherein when the processor performs the operation of performing a roll-forward operation, the processor performs the operations of:
  accessing processor information associated with the critical code from an operating system;
  resetting a program counter for the critical code based on the processor information, the program counter referencing an instruction that was interrupted in the critical code;
  reloading register information for the critical code based on the processor information, the register information containing register values related to the critical code at the time of interruption; and
  wherein the step of returning to execution of the critical code begins execution of the critical code at the instruction that was interrupted in the critical code referenced by the program counter for the critical code.

22. The computerized device of claim 12 wherein:
  a plurality of processors operate in the computerized device and wherein during handling the interruption, an operating system executing on the processor schedules a thread containing the critical code for execution on a processor that is different than a processor upon which the thread was executing at a time of the interruption;

when the processor performs the operation of invoking the critical execution manager, the processor performs the operation of receiving a processor identification indicating an identity of the processor upon which the thread is scheduled to execute; and when the processor performs the operation of performing a reset operation, the processor performs the operation of using the processor identification to adjust an address offset of data referenced by the critical code within memory information associated with a processor upon which the critical code is scheduled to execute next.

23. A computer program product having a computer-readable medium including computer program logic encoded thereon that when performed on a computer system having a coupling of a memory and a processor, causes the processor to execute critical code while avoiding interference by causing the processor to perform the operations of:

registering the critical code for invocation of a critical execution manager in the event of an interruption to the critical code;

executing critical code until an interruption to the critical code occurs;

after handling the interruption, invoking the critical execution manager, the critical execution manager detecting if an interference signal indicates a reset value, and if the interference signal indicates the reset value, performing a reset operation on the critical code to reset a current state of the critical code to allow execution of the critical code while avoiding interference from handling the interruption; and returning to execution of the critical code using the current state of the critical code.

24. A computerized device capable of executing critical code without interference, the computerized device comprising:

a processor;

a memory encoded with an operating system, critical code, and a critical execution manager; and an interconnection mechanism coupling the processor and the memory;

wherein the processor executes code to provide means including:

means for registering the critical code for invocation of a critical execution manager in the event of an interruption to the critical code;

means for executing critical code until an interruption to the critical code occurs; and wherein the processor executes the operating system causing the processor to handle an interruption to the critical code, and wherein after handling the interruption, the processor invokes execution of the critical execution manager providing means including:

means for detecting if an interference signal indicates a reset value, and if the interference signal indicates the reset value, performing a reset operation on the critical code to reset a current state of the critical code to allow execution of the critical code while avoiding interference from handling the interruption; and means for returning to execution of the critical code using the current state of the critical code.

* * * * *

UNITED STATES PATENT AND TRADEMARK OFFICE
CERTIFICATE OF CORRECTION

PATENT NO. : 6,799,236 B1
DATED : September 28, 2004
INVENTOR(S) : David Dice and Alexander T. Garthwaite It is certified that error appears in the above-identified patent and that said Letters Patent is hereby corrected as shown below:

Column 60,
Line 18, "code can begin executions." should read -- code can begin execution --.

Signed and Sealed this

Eighth Day of February, 2005

JON W. DUDAS
*Director of the United States Patent and Trademark Office*